(12) United States Patent
Baghel et al.

(10) Patent No.: US 10,149,280 B2
(45) Date of Patent: Dec. 4, 2018

(54) DEVICE-TO-DEVICE DISCOVERY SIGNALING FOR RADIO RESOURCE ALLOCATION

(71) Applicant: QUALCOMM Incorporated, San Diego, CA (US)

(72) Inventors: Sudhir Kumar Baghel, Bridgewater, NJ (US); Shailesh Patil, North Wales, PA (US)

(73) Assignee: QUALCOMM Incorporated, San Diego, CA (US)

(*) Notice: Subject to any disclaimer, the term of this patent is extended or adjusted under 35 U.S.C. 154(b) by 287 days.

(21) Appl. No.: 14/552,852

(22) Filed: Nov. 25, 2014

(65) Prior Publication Data
US 2015/0208384 A1    Jul. 23, 2015

Related U.S. Application Data

(60) Provisional application No. 61/929,803, filed on Jan. 21, 2014.

(51) Int. Cl.
| | | |
|---|---|---|
| H04W 36/00 | (2009.01) | |
| H04W 72/04 | (2009.01) | |
| H04W 8/00 | (2009.01) | |

(52) U.S. Cl.
CPC ........... *H04W 72/04* (2013.01); *H04W 8/005* (2013.01); *H04W 72/0406* (2013.01)

(58) Field of Classification Search
CPC ............................... H04W 72/04; H04W 8/005
See application file for complete search history.

(56) References Cited

U.S. PATENT DOCUMENTS

| | | | |
|---|---|---|---|
| 2011/0306349 A1* | 12/2011 | Hakola et al. | 455/450 |
| 2013/0059583 A1* | 3/2013 | Van Phan et al. | 455/435.1 |
| 2014/0057670 A1* | 2/2014 | Lim et al. | 455/509 |
| 2014/0369292 A1* | 12/2014 | Wu et al. | 370/329 |
| 2015/0045018 A1* | 2/2015 | Liu et al. | 455/426.1 |
| 2015/0098411 A1* | 4/2015 | Jongren et al. | 370/329 |
| 2015/0124775 A1* | 5/2015 | Guo | 370/331 |
| 2015/0133102 A1* | 5/2015 | Sorrentino | 455/418 |
| 2015/0156743 A1* | 6/2015 | Lee et al. | 455/418 |
| 2015/0163707 A1* | 6/2015 | Hwang et al. | 455/426.1 |

FOREIGN PATENT DOCUMENTS

| | | |
|---|---|---|
| JP | 2002078008 A | 3/2002 |
| WO | WO-2013109077 A1 | 7/2013 |

OTHER PUBLICATIONS

CATT, "Considerations on D2D Discovery Resource Allocation," 3GPP TSG RAN WG2 Meeting #84, Ljubljana, Slovenia, Oct. 11-15, 2013, R2-134062, pp. 1-4, URL: http://www.3gpp.org/ftp/tsg_ran/wg2_r12/TSGR2_72bis/Docs/, 3rd Generation Partnership Project.

(Continued)

*Primary Examiner* — Keith Fang
(74) *Attorney, Agent, or Firm* — Holland & Hart LLP

(57) ABSTRACT

A user device may transmit a request to a base station for an allocation of device-to-device (D2D) discovery resources. In response to the request, the user device may receive from the base station a response that indicates whether the D2D discovery resources allocated to the user device are common or dedicated.

28 Claims, 15 Drawing Sheets

(56) References Cited

OTHER PUBLICATIONS

CMCC, "Discussion on LTE D2D Discovery," 3GPP TSG-RAN WG2 Meeting #83, Barcelona, Spain, Aug. 19-23, 2013, R2-132334, pp. 1-3, URL: http://www.3gpp.org/ftp/tsg_ran/wg2_r12/ TSGR2_83/Docs/, 3rd Generation Partnership Project.

Intel Corporation, "Type 2B Resource Allocation for D2D Discovery," 3GPP TSG-RAN2 Meeting #84, San Francisco, USA, Nov. 11-15, 2013, R2-134287, pp. 1-3, URL: http://www.3gpp.org/ftp/tsg_ran/WG2_RL2/TSGR2_84/docs/, 3rd Generation Partnership Project.

ISA/EPO, International Search Report and Written Opinion of the International Searching Authority, Int'l. App. No. PCT/US2014/067531, dated Mar. 6, 2015, European Patent Office, Rijswijk, NL 13 pgs.

Samsung, "Resource Configuration & Selection for D2D Direct Discovery," 3GPP TSG RAN WG2 Meeting #83, Barcelona, Spain, Aug. 19-23, 2013, R2-132526, pp. 1-4, URL: http://www.3gpp.org/ftp/tsg_ran/wg2_r12/TSGR2_83/Docs/, 3rd Generation Partnership Project.

Samsung, "UE State for D2D Direct Discovery," 3GPP TSG RAN WG2 Meeting #83-bis, Ljubljana, Slovenia, Oct. 7-11, 2013, R2-133215, pp. 1-3, URL: http://www.3gpp.org/ftp/tsg_ran/wg2_r12/TSGR2_83bis/Docs/, 3rd Generation Partnership Project.

ZTE Corporation, "On Resource Allocation for D2D Discovery," 3GPP TSG-RAN WG2 Meeting #84, San Francisco, USA, Nov. 11-15, 2013, R2-134212, pp. 1-5, URL: http://www.3gpp.org/ftp/tsg_ran/WG2_RL2/TSGR2_84/docs/, 3rd Generation Partnership Project.

Insitiure for Information Industry (III): "Evaluations of D2D Discovery Schemes", 3GPP Draft: R1-132541 Evaluations of D2D Discovery Schemes, 3rd Generation Partnership Project (3GPP), Mobile Competence Centre; 650, Route Des Lucioles: F-06921 Sophia-Antipolis Cedex; France, vol. RAN WG1, no. Fukuoka, Japan; May 20, 2013-May 24, 2013, May 11, 2013 (May 11, 2013), XP050698259, Retrieved from the Internet: URL:http://www.3gpp.org/ftp/tsg_ran/WG1_RL1/TSGR1_73/Docs/ [retrieved on May 11, 2013].

ZTE: "Discussion of D2D Discovery", 3GPP Draft; R1-133149 D2D Discovery, 3rd Generation Partnership Project (3GPP), Mobile Competence Centre; 650, Route Des Lucioles; F-06921 Sophia-Antipolis Cedex; France, vol. RAN WG1, no. Barcelona, Spain; Aug. 19, 2013-Aug. 23, 2013, Aug. 10, 2013 (Aug. 10, 2013), XP050716361, Retrieved from the Internet:URL:http://www.3gpp.org/ftp/tsg_ran/WG1_RL1/TSGR1_74/Docs/ [retrieved on Aug. 10, 2013].

\* cited by examiner

DEVICE-TO-DEVICE DISCOVERY SIGNALING FOR RADIO RESOURCE ALLOCATION

CROSS REFERENCES

The present application for patent claims priority to U.S. Provisional Patent Application No. 61/929,803 by Baghel et al., entitled "Device-To-Device Discovery Signaling For Radio Resource Allocation," filed Jan. 21, 2014, assigned to the assignee hereof.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. Generally, a wireless multiple-access communications system may include a number of base stations, each simultaneously supporting communication for multiple user devices. Base stations may communicate with user devices on downstream and upstream links. Each base station has a coverage range, which may be referred to as the coverage area of the base station or cell.

User devices that are proximate to each other may also communicate directly via device-to-device (D2D) communication. D2D communication is carried out using specifically-allocated D2D discovery resources. Before a user device can participate in D2D discovery, however, the user device first acquires the D2D discovery resources allocated to the user device.

SUMMARY

The described features generally relate to one or more improved methods, systems, or apparatuses for managing wireless communications. A first method for wireless communications is described. In one configuration, a user device transmits a request for an allocation of device-to-device discovery resources. The request may be transmitted to a base station in communication with the user device. In response to the request, the user device receives from the base station a response that indicates whether the D2D discovery resources allocated to the user device are common or dedicated.

Similarly, but in another configuration, a base station receives a request from a user device for an allocation of D2D discovery resources. In response to the request, the base station transmits to the user device a response that indicates whether the D2D discovery resources allocated to the user device are common or dedicated.

According to a first set of illustrative embodiments, a method for wireless communication may include transmitting, from a user device, a request for an allocation of D2D discovery resources. The method may also include receiving, responsive to the request, a response indicating whether the D2D discovery resources allocated to the user device are common or dedicated. In some examples, the method may further include receiving, when the D2D discovery resources allocated to the user device are dedicated, an indication of a number of times the allocated D2D discovery resources may be used. Alternatively, the method may further include receiving, when the D2D discovery resources allocated to the user device are dedicated, an indication of an amount of time for which the D2D discovery resources are allocated.

In certain examples, the method may further include receiving in the response, when the D2D discovery resources allocated to the user device are dedicated, an identifier of the D2D discovery resources allocated to the user device, wherein the identifier identifies a plurality of resource blocks (RBs) on a subframe allocated to the user device.

In certain examples, the response may be a radio resource control (RRC) message, a medium-access control (MAC) layer message or a physical (PHY) layer message. For example, in certain examples, the response may be an RRCConnectionReconfiguration message modified to include D2D discovery information or a downlink control information (DCI) message granting D2D transmission resource allocation for uplink. As additional examples, the request may be formatted as an RRC message formatted for D2D discovery requests. Alternatively, the request may be formatted using a message format that is used for non-D2D discovery requests, with an indicator that the request relates to D2D discovery included in the request. The request may be formatted using a message format of a buffer status report (BSR). Alternatively, the request may be formatted using a message associated with a random-access channel (RACH) process.

In certain examples, the response for an allocation of D2D discovery resources may be empty when the user device has no valid allocated D2D discovery resources and the request is rejected or only common allocated D2D discovery resources. In other examples, the request for an allocation of D2D discovery resources may include information regarding D2D discovery resources previously allocated to the user device and an identifier of a base station which previously allocated D2D discovery resources to the user device.

In certain examples, the method may further include transmitting a D2D discovery message using the allocated D2D discovery resources allocated to the user device during a discovery period that begins after the user device receives the response. Alternatively, the method may further include transmitting a D2D discovery message using the D2D discovery resources allocated to the user device during a discovery period that begins before the user device receives the response as long as the response is received between a beginning of the discovery period and a threshold time.

As a further example, the method may include receiving at the user device an identification of a plurality of neighboring base stations which have allocated the D2D discovery resources to the user device. The identification of the plurality of neighboring base stations may be received as part of a system information block (SIB) message or as part of the response. The method may further include transmitting a second request from the user device for a second allocation of D2D discovery resources when the user device is in communication with a base station that is not one of the plurality of neighboring base stations.

In certain examples, the request may include a plurality of expressions to be transmitted and corresponding requests for D2D discovery resources for the user device, and the response includes a corresponding plurality of indications of whether D2D discovery resources allocated to the user device are common or dedicated. In these examples, the response may include an expression index to correlate a plurality of allocated D2D discovery resources with the plurality of the requests. In other examples, the request for an allocation of D2D discovery resources may include an indicator that the user device is authorized to participate in D2D discovery.

In some examples, the method may also include determining, from the response, a number of discovery signal transmissions to be performed by the user device. In some examples, the method may further include determining, from the response, a number of empty discovery signal transmissions after which the user device may determine that the D2D discovery resources allocated to the user device are deallocated.

According to a second set of illustrative embodiments, an apparatus for wireless communication may include means for transmitting, from a user device, a request for an allocation of D2D discovery resources, as well as means for receiving, responsive to the request, a response indicating whether the D2D discovery resources allocated to the user device are common or dedicated. The apparatus may further include means for receiving, when the D2D discovery resources allocated to the user device are dedicated, an indication of a number of times the allocated D2D discovery resources may be used. Additionally, the apparatus may further include means for receiving, when the D2D discovery resources allocated to the user device are dedicated, an indication of an amount of time for which the D2D discovery resources are allocated.

In certain examples, the apparatus may further include means for receiving in the response, when the D2D discovery resources allocated to the user device are dedicated, an identifier of the D2D discovery resources allocated to the user device, wherein the identifier identifies a plurality of RBs on a subframe allocated to the user device. In other examples, the apparatus may further include means for including in the request for an allocation of D2D discovery resources information regarding D2D discovery resources previously allocated to the user device and an identifier of a base station which previously allocated D2D discovery resources to the user device.

In certain examples, the apparatus may include means for transmitting a D2D discovery message using the allocated D2D discovery resources allocated to the user device during a discovery period that begins after the user device receives the response. In other examples, the apparatus may include means for transmitting a D2D discovery message using the D2D discovery resources allocated to the user device during a discovery period that begins before the user device receives the response as long as the response is received between a beginning of the discovery period and a threshold time. In still further examples, the apparatus may include means for receiving at the user device an identification of a plurality of neighboring base stations which have allocated the D2D discovery resources to the user device.

According to an additional set of illustrative embodiments, an apparatus configured for wireless communication may include at least one processor and a memory couple to said at least one processor. The at least one processor is configured to transmit, from a user device a request for an allocation of D2D discovery resources. The at least one processor may also be configured to receive, responsive to the request, a response indicating whether the D2D discovery resources allocated to the user device are common or dedicated. In certain examples, the processor may be further configured to receive, when the D2D discovery resources allocated to the user device are dedicated, an indication of a number of times the allocated D2D discovery resources may be used. Alternatively, the processor may be further configured to receive, when the D2D discovery resources allocated to the user device are dedicated, an indication of an amount of time for which the D2D discovery resources are allocated.

In certain examples, the processor may be further configured to receive in the response, when the D2D discovery resources allocated to the user device are dedicated, an identifier of the D2D discovery resources allocated to the user device, wherein the identifier identifies a plurality of RBs on a subframe allocated to the user device. In other examples, the processor may be further configured to include in the request for an allocation of D2D discovery resources information regarding D2D discovery resources previously allocated to the user device and an identifier of a base station which previously allocated D2D discovery resources to the user device. In still other examples, the processor may be further configured to receive at the user device an identification of a plurality of neighboring base stations which have allocated the D2D discovery resources to the user device.

According to an additional set of illustrative embodiments, a computer program product may include a non-transitory computer-readable medium having non-transitory program code recorded thereon. The non-transitory program code may include program code to transmit, from a user device, a request for an allocation of D2D discovery resources. The non-transitory program code may also include program code to receive, responsive to the request, a response indicating whether the D2D discovery resources allocated to the user device are common or dedicated. In certain examples, the program code may further include program code to receive, when the D2D discovery resources allocated to the user device are dedicated, an indication of a number of times the allocated D2D discovery resources may be used. In other examples, the program code may further include program code to receive, when the D2D discovery resources allocated to the user device are dedicated, an indication of an amount of time for which the D2D discovery resources are allocated.

In certain examples, the program code may include program code to receive in the response, when the D2D discovery resources allocated to the user device are dedicated, an identifier of the D2D discovery resources allocated to the user device, wherein the identifier identifies a plurality of RBs on a subframe allocated to the user device. In other examples, the program code may include program code to include in the request for an allocation of D2D discovery resources information regarding D2D discovery resources previously allocated to the user device and an identifier of a base station which previously allocated D2D discovery resources to the user device. In still other examples, the program code may include program code to receive at the user device an identification of a plurality of neighboring base stations which have allocated the D2D discovery resources to the user device.

According to yet another additional set of illustrative embodiments, a method for wireless communication may include receiving, from a user device, a request for an allocation of D2D discovery resources, and transmitting a response to the request, the response indicating whether D2D discovery resources allocated to the user device are common or dedicated. The method may further include indicating, when the D2D discovery resources allocated to the user device are dedicated, a number of D2D discovery transmissions for which the D2D discovery resources are allocated. Additionally, the method may include indicating, when the D2D discovery resources allocated to the user device are dedicated, an amount of time for which the D2D discovery resources are allocated.

In certain examples, the method may comprise including in the response an identifier of the D2D discovery resources allocated to the user device. The identifier may identify a plurality of RBs on a subframe allocated to the user device. Further, the response may be formatted as any one of a RRC message, a MAC layer message or a PHY layer message. Additionally, the response may be formatted as any one of an RRCConnectionReconfiguration message modified to include D2D discovery information or a downlink control information message granting D2D transmission resource allocation for uplink.

In certain examples, the method may include receiving in the request for an allocation of D2D discovery resources information regarding D2D discovery resources previously allocated to the user device and an identifier of a base station which previously allocated D2D discovery resources to the user device. The method may also include forwarding the information regarding D2D discovery resources previously allocated to the user device to the base station which previously allocated D2D discovery resources to the user device so that the base station can release the D2D discovery resources previously allocated to the user device. Alternatively, the method may include forwarding the information regarding D2D discovery resources previously allocated to the user device to any base station in a group of base stations that includes the base station which previously allocated D2D discovery resources to the user device so that the base stations in the group can release the D2D discovery resources previously allocated to the user device. In yet another alternative embodiment, the method may include forwarding the information regarding D2D discovery resources previously allocated to the user device to a mobility management entity (MME) so that the MME can inform base stations in a group of base stations that includes the base station which previously allocated D2D discovery resources to the user device that the base stations can release the D2D discovery resources previously allocated to the user device.

In certain examples, the response may be empty when D2D discovery resources (e.g., the request is rejected) allocated to the user device are common.

In certain other examples, the method may include transmitting to the user device an indication of a plurality of neighboring base stations which have allocated the D2D discovery resources to the user device. The indication of the plurality of neighboring base stations may be transmitted as part of a SIB message or as part of the response. Additionally, the plurality of neighboring base stations may be a group of base stations corresponding to a tracking area used for paging.

In certain examples, the request may include a plurality of requests for D2D discovery resources for the user device, and the response includes a corresponding plurality of indications of whether D2D discovery resources allocated to the user device are common or dedicated.

According to yet another additional set of illustrative embodiments, an apparatus for wireless communication may include means for receiving, from a user device, a request for an allocation of D2D discovery resources, as well as means for transmitting a response to the request, the response indicating whether D2D discovery resources allocated to the user device are common or dedicated. The apparatus may further include means for indicating, when the D2D discovery resources allocated to the user device are dedicated, a number of D2D discovery transmissions for which the D2D discovery resources are allocated. Additionally, the apparatus may further include means for indicating, when the D2D discovery resources allocated to the user device are dedicated, an amount of time for which the D2D discovery resources are allocated. In certain examples, the apparatus may include means for including in the response an identifier of the D2D discovery resources allocated to the user device.

In certain examples, the apparatus may include means for receiving in the request for an allocation of D2D discovery resources information regarding D2D discovery resources previously allocated to the user device and an identifier of a base station which previously allocated D2D discovery resources to the user device. The apparatus may further include means for forwarding the information regarding D2D discovery resources previously allocated to the user device to the base station which previously allocated D2D discovery resources to the user device so that the base station can release the D2D discovery resources previously allocated to the user device. Alternatively, the apparatus may further include means for forwarding the information regarding D2D discovery resources previously allocated to the user device to any base station in a group of base stations that includes the base station which previously allocated D2D discovery resources to the user device so that the base stations in the group can release the D2D discovery resources previously allocated to the user device. Further, the apparatus may include means for forwarding the information regarding D2D discovery resources previously allocated to the user device to a MME so that the MME can inform base stations in a group of base stations that includes the base station which previously allocated D2D discovery resources to the user device that the base stations can release the D2D discovery resources previously allocated to the user device.

In certain examples, the apparatus may further include means for transmitting to the user device an indication of a plurality of neighboring base stations which have allocated the D2D discovery resources to the user device.

According to yet another additional set of illustrative embodiments, an apparatus configured for wireless communication may include at least one processor and a memory coupled to said at least one processor. The at least one processor may be configured to receive, from a user device, a request for an allocation of D2D discovery resources. Additionally, the at least one processor may be configured to transmit a response to the request, the response indicating whether D2D discovery resources allocated to the user device are common or dedicated. The processor may further be configured to indicate, when the D2D discovery resources allocated to the user device are dedicated, a number of D2D discovery transmissions for which the D2D discovery resources are allocated. Additionally, the processor may be further configured to indicate, when the D2D discovery resources allocated to the user device are dedicated, an amount of time for which the D2D discovery resources are allocated.

In certain examples, the processor may be further configured to receive in the request for an allocation of D2D discovery resources information regarding D2D discovery resources previously allocated to the user device and an identifier of a base station which previously allocated D2D discovery resources to the user device. In this case, the processor may be further configured to forward the information regarding D2D discovery resources previously allocated to the user device to the base station which previously allocated D2D discovery resources to the user device so that the base station can release the D2D discovery resources previously allocated to the user device. In certain examples, the processor may be further configured to transmit to the user device an indication of a plurality of neighboring base stations which have allocated the D2D discovery resources to the user device.

According to yet another additional set of illustrative embodiments, a computer program product may include a non-transitory computer-readable medium having non-transitory program code recorded thereon. The non-transitory program code may include program code to receive, from a user device, a request for an allocation of D2D discovery resources, and program code to transmit a response to the request, the response indicating whether D2D discovery resources allocated to the user device are common or dedicated. In certain examples, the program code may further include program code to indicate, when the D2D discovery resources allocated to the user device are dedicated, a number of D2D discovery transmissions for which the D2D discovery resources are allocated. In other examples, the program code may further include program code to indicate, when the D2D discovery resources allocated to the user device are dedicated, an amount of time for which the D2D discovery resources are allocated.

In certain examples, the program code may further include program code to receive in the request for an allocation of D2D discovery resources information regarding D2D discovery resources previously allocated to the user device and an identifier of a base station which previously allocated D2D discovery resources to the user device. In this case, the program code may include program code to forward the information regarding D2D discovery resources previously allocated to the user device to the base station which previously allocated D2D discovery resources to the user device so that the base station can release the D2D discovery resources previously allocated to the user device. In other examples, the program code may further include program code to transmit to the user device an indication of a plurality of neighboring base stations which have allocated the D2D discovery resources to the user device.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Typically, user devices engage in wireless communication by communicating with a base station of a wireless communications system. However, users of user devices may also participate in device-to-device wireless communications. D2D wireless communications allow user devices that are within range of each other to communicate directly with each other instead of communicating through a base station. An example of when D2D wireless communication is desirable is when a user device leaves the coverage of a base station. In order to avoid an interruption in service, the user device which has left the coverage area may broadcast a peer discovery message, such as a Direct Peer-Discovery Signal in a Long Term Evolution (LTE) system, which may then be received by an in-coverage user device. Once the two user devices have discovered each other, the in-coverage user device may act as a relay between the out-of-coverage user device and the base station. Other uses of D2D wireless communications also exist. Wireless communications between devices for purposes of D2D discovery, however, occur using specifically allocated D2D discovery resources. Therefore, before a user device engages in D2D discovery, the user device may need to determine the specific D2D discovery resources allocated to the user device, as well as details that may govern the use of those resources.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
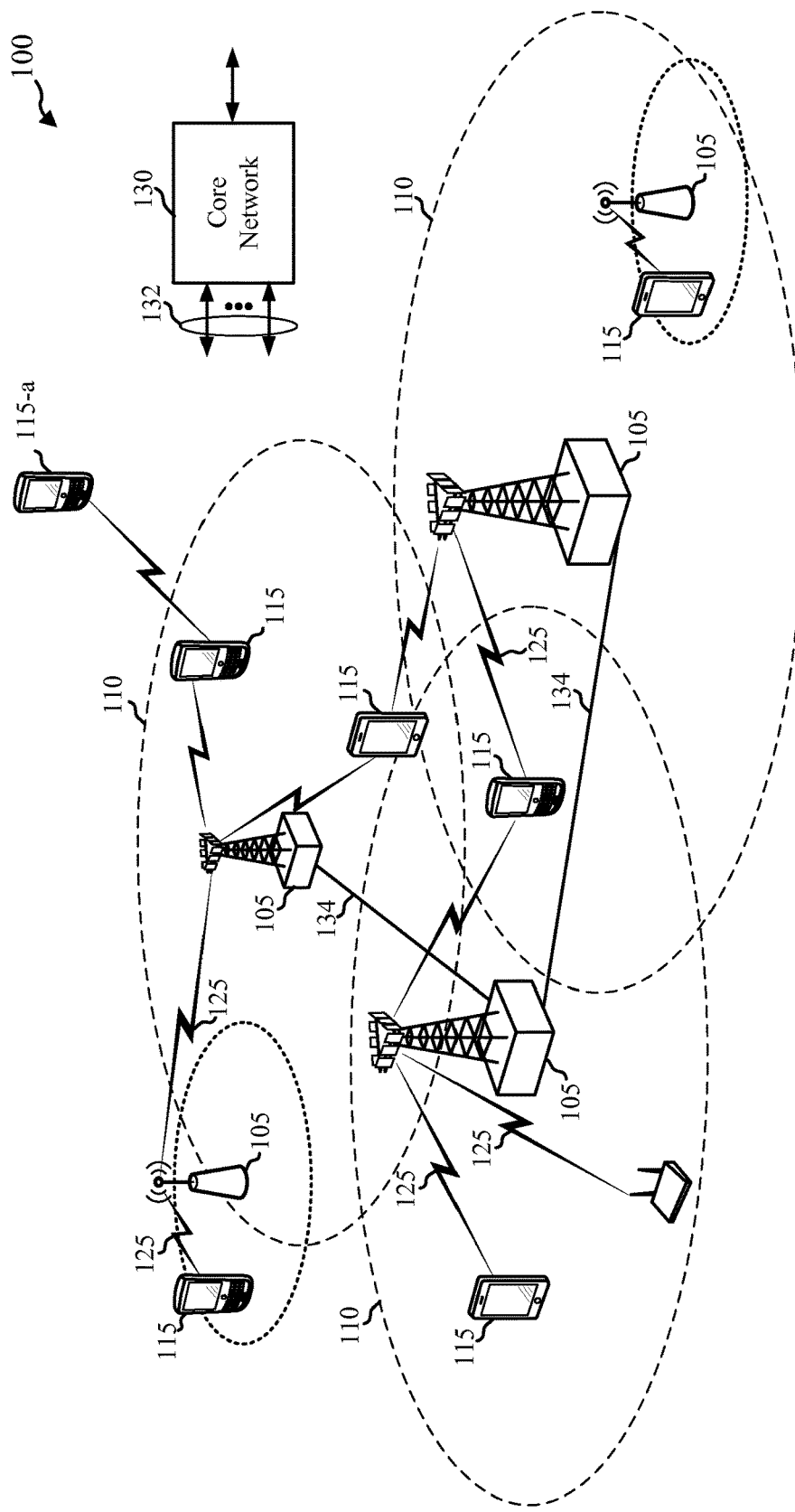
FIG. 1 is a block diagram of an example of a wireless communications system, in accordance with various embodiments.

Referring first to FIG. 1, a diagram illustrates an example of a wireless communications system 100. The wireless communications system 100 includes base stations (or cells) 105, communication devices 115, and a core network 130. The base stations 105 may communicate with the communication devices 115 under the control of a base station controller, which may be part of the core network 130 or the base stations 105 in various embodiments. Base stations 105 may communicate control information or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, and the like.

The base stations 105 may wirelessly communicate with the user devices 115 via one or more base station antennas. Each of the base station 105 sites may provide communication coverage for a respective coverage area 110. In some embodiments, a base station 105 may be referred to as a base transceiver station, a radio base station, an access point, a radio transceiver, a basic service set (BSS), an extended service set (ESS), a NodeB, an eNodeB (eNB), a Home NodeB, a Home eNodeB, or some other suitable terminology. The coverage area 110 for a base station 105 may be divided into sectors making up only a portion of the coverage area 110. The system 100 may include base stations 105 of different types (e.g., macro, micro, pico, or femto base stations). There may be overlapping coverage areas for different technologies.

In embodiments, the system 100 is an LTE/LTE-A network. In LTE/LTE-A networks, the terms evolved Node B (eNB) and user equipment (UE) may be generally used to describe the base stations 105 and user devices 115, respectively. The system 100 may be a Heterogeneous LTE/LTE-A network in which different types of base stations provide coverage for various geographical regions. For example, each base station 105 may provide communication coverage for a macro cell, a pico cell, a femto cell, or other types of cell. A macro cell generally covers a relatively large geographic area (e.g., several kilometers in radius) and may allow unrestricted access by user devices with service subscriptions with a network provider. A pico cell would generally cover a relatively smaller geographic area and may allow unrestricted access by user devices with service subscriptions with the network provider. A femto cell would also generally cover a relatively small geographic area (e.g., a home) and, in addition to unrestricted access, may also provide restricted access by user devices having an association with the femto cell (e.g., user devices in a closed subscriber group (CSG), user devices for users in the home, and the like). A base station for a macro cell may be referred to as a macro eNB, for example. A base station for a pico cell may be referred to as a pico eNB. And, a base station for a femto cell may be referred to as a femto eNB or a home eNB. A base station may support one or multiple (e.g., two, three, four, etc.) cells.

The core network 130 may communicate with the base stations 105 via backhaul links 132 (e.g., S1, etc.). The base stations 105 may also communicate with one another, e.g., directly or indirectly via backhaul links 134 (e.g., X2, etc.) or via backhaul links 132 (e.g., through core network 130). The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The base stations 105 may also communicate their frame timing and other information to the user devices 115. Thus, the wireless communications between the base stations 105 and the user devices 115 may include transmission of various commands and information. Among the information that may be communicated from a base station 105 to a user device 115 is information pertaining to the resources allocated to the user device 115 for D2D discovery. The D2D discovery resources information may include an identification of the type of allocated D2D discovery resources, as well as the resource identity. This discovery resource information and its communication are further explained in the embodiments below.

The user devices 115 are dispersed throughout the wireless communications system 100, and each user device 115 may be stationary or mobile. A user device 115 may also be referred to by those skilled in the art as a UE, a mobile device, a mobile station, a subscriber station, a mobile unit, a subscriber unit, a wireless unit, a remote unit, a wireless device, a wireless communications device, a remote device, a mobile subscriber station, an access terminal, a mobile terminal, a wireless terminal, a remote terminal, a handset, a user agent, a mobile client, a client, a relay, or some other suitable terminology. A user device 115 may be a cellular phone, a personal digital assistant (PDA), a wireless modem, a wireless communication device, a handheld device, a tablet computer, a laptop computer, a cordless phone, a wireless local loop (WLL) station, or the like. A user device 115 may be able to communicate with macro eNBs, pico eNBs, femto eNBs, relays, and the like. A user device 115-a may also communicate directly with another user device 115 via D2D wireless communications. In one example, a user device 115 within a coverage area 110 of a base station 105 may serve as a relay for a user device 115-a that is outside the coverage area 110 of the base station 105. The in-coverage user device 115 may relay (or retransmit) communications from the base station 105 to the out-of-coverage user device 115-a. Similarly, the in-coverage user device 115 may relay communications from the out-of-coverage user device 115-a to the base station 105.

In order for a user device 115 to participate as a relay between base stations 105 and other user devices 115 (for example, out-of-coverage user device 115-a), the user devices 115 may participate in D2D discovery. To do so, the user device 115 may first need to determine what D2D discovery resources have been allocated to the user device 115 by a base station 105 with which the user device 115 is in communication. Thus, the user devices 115 may request D2D discovery resource information from a base station 105, which may then respond with the requested information. The D2D discovery resource requests and responses, along with their use, are explained in greater detail below.

The communication links 125 shown in wireless communications system 100 may include uplink (UL) transmissions from a user device 115 to a base station 105 or downlink (DL) transmissions from a base station 105 to a user device 115. The downlink transmissions may also be called forward link transmissions while the uplink transmissions may also be called reverse link transmissions.

Figure 2:
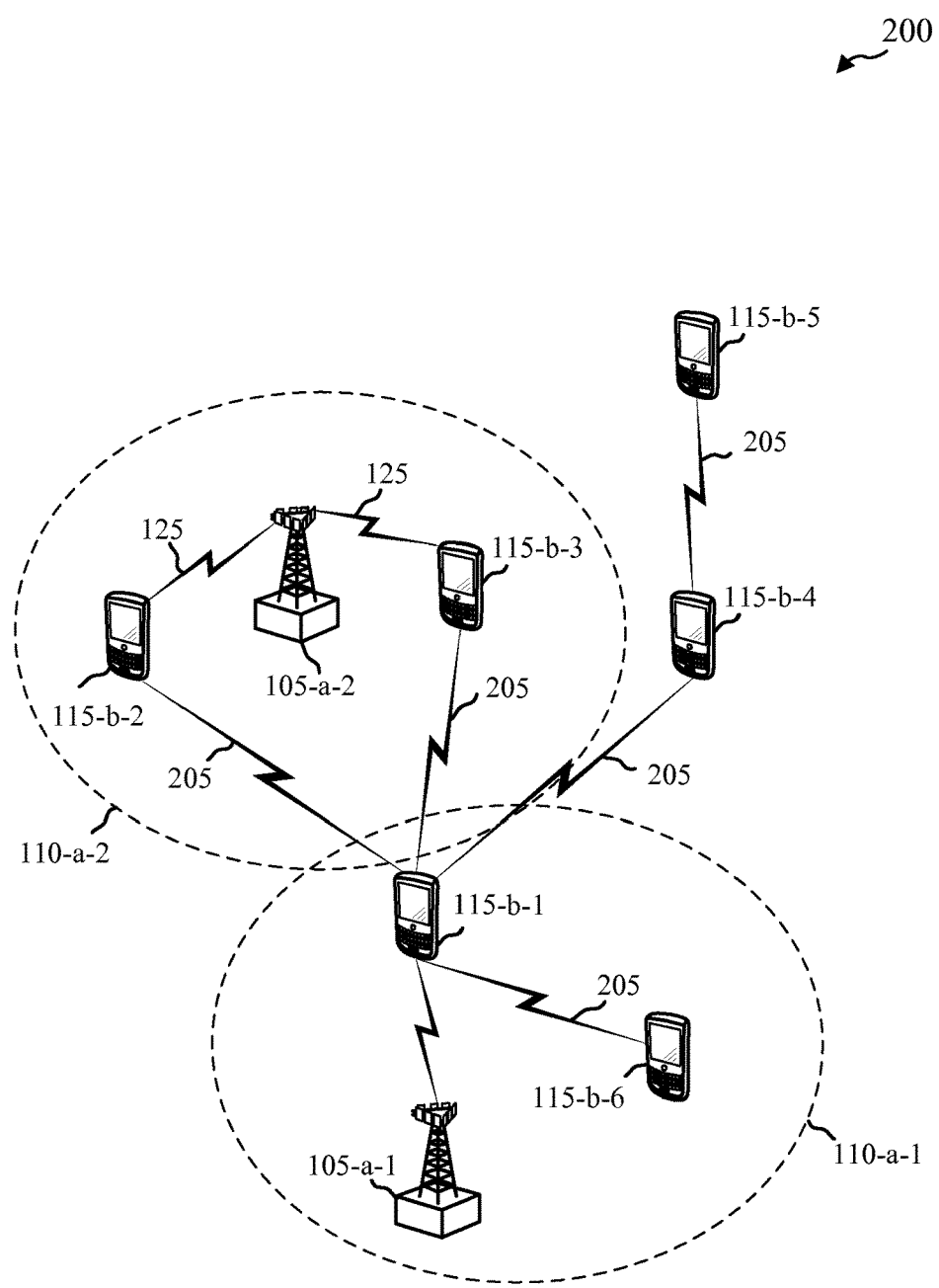
FIG. 2 is a block diagram of an example of a system for device-to-device discovery and wireless communication, in accordance with various embodiments.

FIG. 2 is a block diagram of an example of a system 200 in which D2D communications may be implemented. The system 200 of FIG. 2 may be an example of the wireless communications system 100 described with respect to FIG. 1. In one configuration, a base station 105-*a*-1 may communicate with one or more user devices 115-*b* that fall within a coverage area 110-*a*-1 of the base station 105-*a*-1. An in-coverage user device 115-*b*-1 may receive/transmit communications from/to the base station 105-*a*-1. One or more user devices 115-*b*-2, 115-*b*-3, 115-*b*-4, 115-*b*-5 may be outside of the coverage area 110-*a*-1 of the base station 105-*a*-1 and may participate in D2D communications. Other user devices 115-*b*-6 may be within the coverage area 110-*a*-1 of the base station 105-*a*-1, but may also participate in D2D communications. User devices 115-*b*-2, 115-*b*-3 may also be within the coverage area 110-*a*-2 of a different base station 105-*a*-2 and may be in communication with the base station 105-*a*-2. The base stations 105-*a* and the user devices 115-*b* may be examples of the base stations 105 and user devices 115 described with reference to FIG. 1.

In one embodiment, the in-coverage user device 115-*b*-1 may broadcast, multi-cast, or unicast a peer discovery signal 205. The peer discovery signal 205 may be sent to one or more user devices 115-*b* that are either in- or out-of-coverage. The peer discovery signal 205 may be a Long Term Evolution (LTE) Direct Peer-Discovery Signal. In one configuration, the peer discovery signal 205 may include an identifier of the in-coverage user device 115-*b*-1. For example, the identifier may be a medium access control (MAC) address of the in-coverage user device 115-*b*-1. In addition, the peer discovery signal 205 may include a relay status of the user device 115-*b*-1. The relay status may indicate whether the in-coverage user device 115-*b*-1 is capable of providing relay services for one or more out-of-coverage user devices 115.

In one example, an out-of-coverage user device 115 may receive peer discovery signals 205 indicating that each of one or more in-coverage user devices 115 is capable of functioning as a relay device. The out-of-coverage user device 115 may then select one of the in-coverage user devices 115 to provide relay services. The determination as to which in-coverage user device 115 to select may be based on a signal strength of the peer discovery signals 205 received from each in-coverage user device 115, the identities of the in-coverage user devices 115, or various other factors (e.g., the remaining battery life of each in-coverage user device 115 (if operating on batteries), the type(s) of service(s) supported by each in-coverage user device 115 (if the relay devices are selective about which services or applications they can or are willing to provide relay service for), or the radio technology(ies) for which each in-coverage user device 115 is willing to provide relay service. Some or all of these factors may be indicated or derived from D2D discovery signals. Some of the factors may also or alternately be obtained by querying the in-coverage user device(s) 115 from which the out-of-coverage user device received relay status and identifier information.

In one configuration, an out-of-coverage user device 115-*b* may transmit a D2D discovery signal 205 to one or more in-coverage user devices 115-*b*. The peer discovery signal 205 may indicate that the out-of-coverage user device 115-*b* is out-of-coverage or requesting relay services. The signal 205 may include an identifier of the out-of-coverage user device 115-*b*. In one configuration, a user device 115-*b* may broadcast a D2D discovery signal 205 when it senses that it is about to be out of the coverage area 110-*a*-1 of the base station 105-*a*-1. In another embodiment, a user device 115-*b* may broadcast the signal 205 after it is already out of the coverage area 110-*a*-1.

In a configuration, a first out-of-coverage user device 115-*b*-4 may serve as a relay device for a second out-of-coverage user device 115-*b*-5. The first out-of-coverage user device 115-*b*-4 may transmit a peer discovery signal 205 to inform the second out-of-coverage user device 115-*b*-5 that the user device 115-*b*-4 is capable of providing relay services. As another example, the second out-of-coverage user device 115-*b*-5 may transmit a signal 205 requesting relay services from the first out-of-coverage user device 115-*b*-4. As a result, the in-coverage user device 115-*b*-1 may relay communications to/from the base station 105-*a* from/to the first out-of-coverage user device 115-*b*-4. The first out-of-coverage user device 115-*b*-4 may relay at least a part of the communications from/to the second out-of-coverage user device 115-*b*-5.

As an additional example, two in-coverage user devices 115-*b*-1, 115-*b*-6 may also communicate with each other via a direct D2D connection. In this example, the user device 115-*b*-6 may transmit a signal 205 requesting a direct D2D connection with other user devices 115-*b* proximate to the user device 115-*b*-6. The user device 115-*b*-1 may receive the request and then initiate direct D2D communications with the user device 115-*b*-6.

In an additional example, the user devices 115-*b*-2, 115-*b*-3, may each communicate with the user device 115-*b*-1 via direct D2D connections. For example, the user device 115-*b*-1 may act as a relay to the user devices 115-*b*-2, 115-*b*-3. In this example, the D2D discovery resources used would include those allocated to the relaying user device 115-*b*-1 by the base station 105-*a*-1. Alternatively, one of user devices 115-*b*-2 or 115-*b*-3 may act as a relay between the user device 115-*b*-1 and base station 105-*a*-2. In this example, the D2D discovery resources used would include those allocated to one of the user devices 115-*b*-2, 115-*b*-3 by the base station 105-*a*-2. In yet another example, base stations 105-*a*-1, 105-*a*-2 may communicate with each other to ensure that a the D2D discovery resources allocated to a user device 115-*b* remain constant within the coverage areas 110-*a*-1, 110-*a*-2. If D2D discovery resource allocation for a specific user device (e.g., user device 115-*b*-2) is consistent across multiple base stations 115-*b* (e.g., base stations 105-*a*-1, 105-*a*-2), then the user device need not request updated discovery resources when the user device 115-*b* is moved between the coverage areas 110-*a*-1, 110-*a*-2.

Before any of the examples of D2D communication described above can occur, however, the user devices 115 transmitting/receiving peer discovery signals 205 may need to determine which resources are allocated for D2D discovery. D2D discovery resource allocation may be performed by one of the base stations 105-*a*-1, 105-*a*-2. The user devices 115-*b* may need to request D2D discovery resource allocation information from the base stations 105-*a* prior to engaging in D2D discovery. In order to facilitate these communications, a D2D discovery resource messaging protocol can be used, as explained below.

Figure 3:
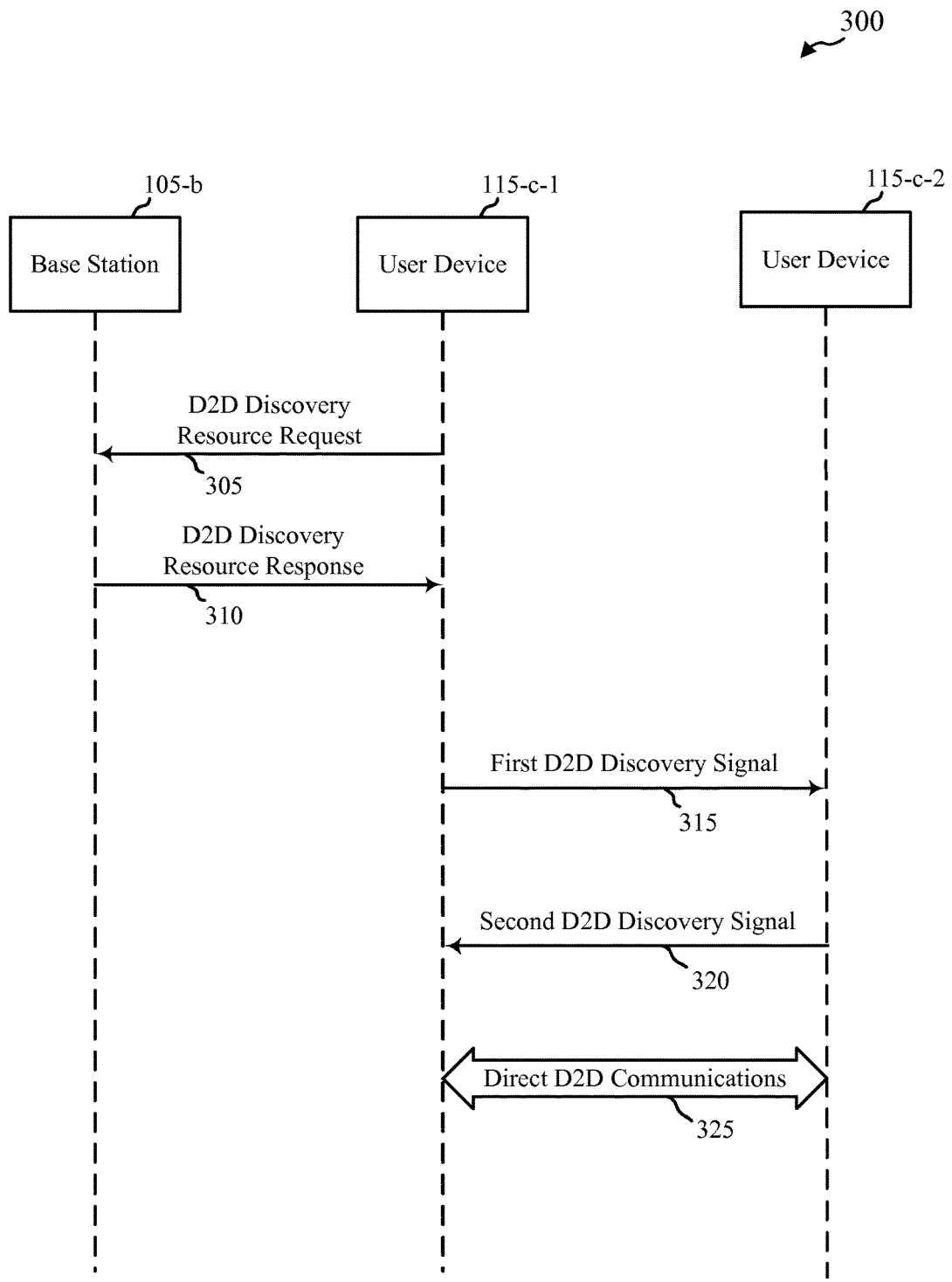
FIG. 3 is a message flow diagram illustrating communications between user devices and a base station engaging in device-to-device discovery, in accordance with various embodiments.

FIG. 3 is a message flow diagram 300 illustrating an embodiment of D2D discovery communications between a base station 105-*b* and user devices 115-*c*-1, 115-*c*-2. The base station 105-*b* and user devices 105-*c* may be examples of the base stations 105 and user devices 115 described in FIG. 1 or 2.

In one configuration, the user device 115-*c*-1 is to be used in D2D discovery. In order to do so, the user device 115-*c*-1 first contacts the base station 105-*b* by transmitting a D2D discovery resource request 305 to the base station 105-*b*. The D2D discover resource request 305 is a request from the user device 115-*c*-1 for D2D discovery resources to be allocated to the user device 115-*c*-1. In response to the request 305, the base station 105-*b* transmits to the user device 115-*c*-1 a D2D discovery resource response 310. The D2D discovery resource response 310 indicates to the user device 115-*c*-1 a type of discovery resource that has been allocated to the user device 115-*c*-1 for D2D discovery. For example, one type of discovery resource that may be allocated to a user device 115 is referred to as Type 1 or common resource allocation. Discovery resources that are common or Type 1 are not specific to any given user device and instead represent a pool of discovery resources from which more than one user device may autonomously select a resource to use for D2D discovery. Another type of discovery resource that may be allocated to a user device 115 is referred to as Type 2 or dedicated resource allocation. Type 2 or dedicated resources are uniquely allocated to individual user devices 115. Type 2 or dedicated resource allocation includes two different variations: Type 2A and Type 2B. In Type 2A, dedicated D2D discovery resources are allocated to a user device 115 for each discovery signal transmission. Thus, once a user device 115 uses a Type 2A dedicated discovery resource, the user device 115 may need to request additional D2D discovery resource allocations from the base station 105 if the user device 115 is to engage in further D2D discovery. In Type 2B, dedicated D2D discovery resources are allocated to a user device 115 for a specific duration. The identified duration may be expressed in a number of D2D discovery transmissions the user device 115 may engage in. Alternatively, the identified duration may be expressed in a duration of time. Thus, Type 2A allocation is actually a special case version of Type 2B allocation, where, in Type 2A, the identified duration is a single transmission.

Once user device 115-*c*-1 receives the D2D discovery resource response 310, with its allocation of either Type 1 or Type 2 D2D discovery resources, the user device 115-*c*-1 may engage in D2D discovery using the allocated resources. As an example of D2D discovery, the user device 115-*c*-1 may use the received D2D discovery resource response 310 to identify a D2D discovery resource which may be used to transmit a first D2D discovery signal 315. The first D2D discovery signal 315 may, for example, be a request to participate in D2D discovery. Another user device 115-*c*-2 may receive the first D2D discovery signal 315 and may elect to respond by transmitting a second D2D discovery signal 320. The second D2D discovery signal 320 may be a response accepting the user device 115-*c*-1 request for D2D discovery. After the D2D discovery signals 315, 320 are exchanged, the user devices 115-*c*-1, 115-*c*-2 are able to participate in direct D2D communication 325 with each other.

In the example described above with respect to FIG. 3, the user device 115-*c*-2 was able to receive the first D2D discovery signal 315 from the user device 115-*c*-1. This means that the user device 115-*c*-2 also was aware of which D2D discovery resources to monitor. Although not illustrated in FIG. 3, the user device 115-*c*-2 could have been made aware through an additional D2D discovery resource request/response exchange with the base station 105-*b*, in which the base station 105-*b* identified to the user device 115-*c*-2 all D2D discovery resources (regardless of whether the resources are Type I or Type 2) to be monitored.

Figure 4:
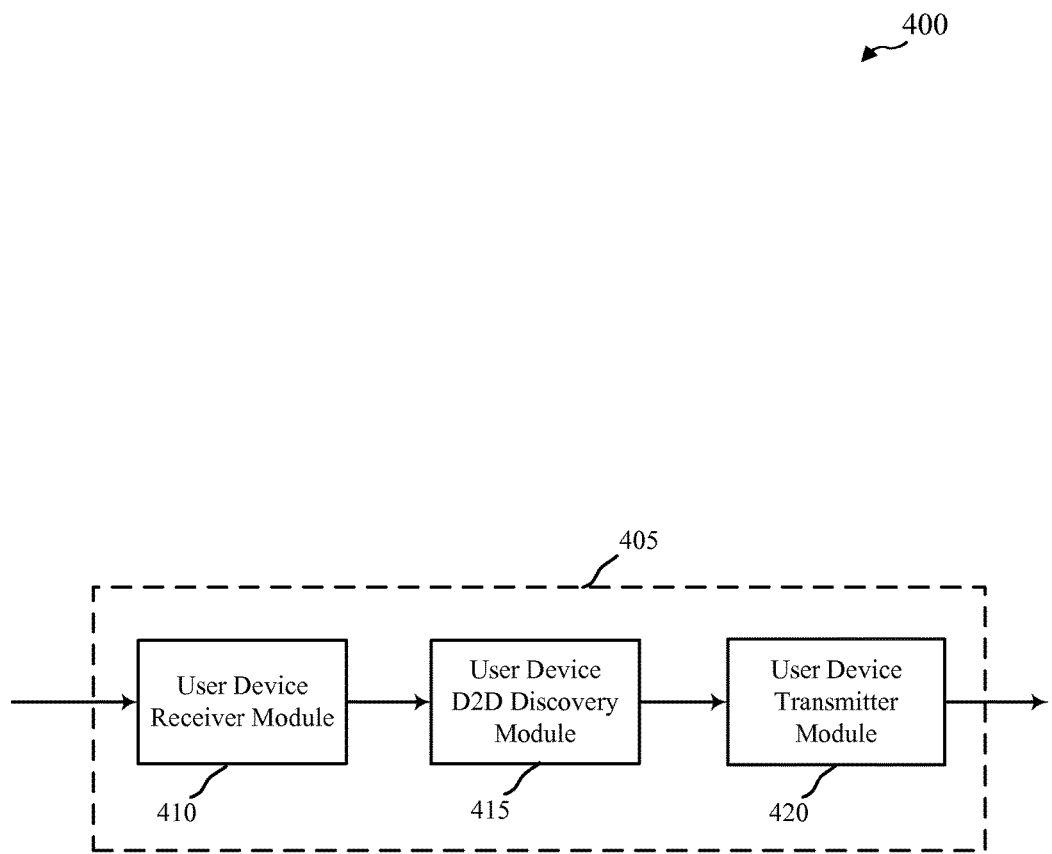
FIG. 4 is a block diagram of an example of a user device, in accordance with various embodiments.

FIG. 4 is an example of a block diagram 400 of an apparatus 405 for use in wireless communication, in accordance with various aspects of the present disclosure. In some examples, the apparatus 405 may be an example of aspects of one or more of the user devices 115 described with reference to FIGS. 1, 2 and/or 3, and may transmit and receive D2D discovery resource requests and responses. The apparatus 405 may also be a processor. The apparatus 405 may include a user device receiver module 410, a user device D2D discovery module 415, and/or a user device transmitter module 420. Each of these components may be in communication with each other.

The components of the apparatus 405 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the user device receiver module 410 may include at least one radio frequency (RF) receiver, such as at least one RF receiver operable to receive transmissions over a radio frequency spectrum. In some examples, the radio frequency spectrum may be used for LTE/LTE-A communications, as described, for example, with reference to FIGS. 1 and 2. The user device receiver module 410 may be used to receive various types of data or control signals (i.e., transmissions) over one or more communication links of a wireless communications system, such as one or more communication links 125 of the wireless communications system 100 described with reference to FIGS. 1 and/or 2. Examples of the types of data or control signals received by the user device receiver module 410 include the D2D discovery resource response 310 described with reference to FIG. 3.

In some examples, the user device transmitter module 420 may include at least one RF transmitter, such as at least one RF transmitter operable to transmit discovery messages. The user device transmitter module 420 may be used to transmit various types of data or control signals (i.e., transmissions) over one or more communication links of a wireless communications system, such as one or more communication links 125 of the wireless communications system 100 described with reference to FIGS. 1 and/or 2. Examples of the types of data or control signals transmitted by the user device transmitter module 420 include the D2D discovery resource request 305 described with reference to FIG. 3.

In some examples, the user device D2D discovery module 415 may be used to manage the transmission of D2D discovery resource requests 305 and the receipt of D2D discovery resource responses 310 (see FIG. 3) via the user device receiver module 410 and/or the user device transmitter module 420. Managing the transmission and receipt of D2D discovery resource requests and responses may include requesting D2D discovery resources, receiving an allocation of D2D discovery resources of a specific type as well as related information, and applying the received D2D discovery resource information to the process of receiving and transmitting D2D discovery signals 315, 320 (of FIG. 3).

Figure 5:
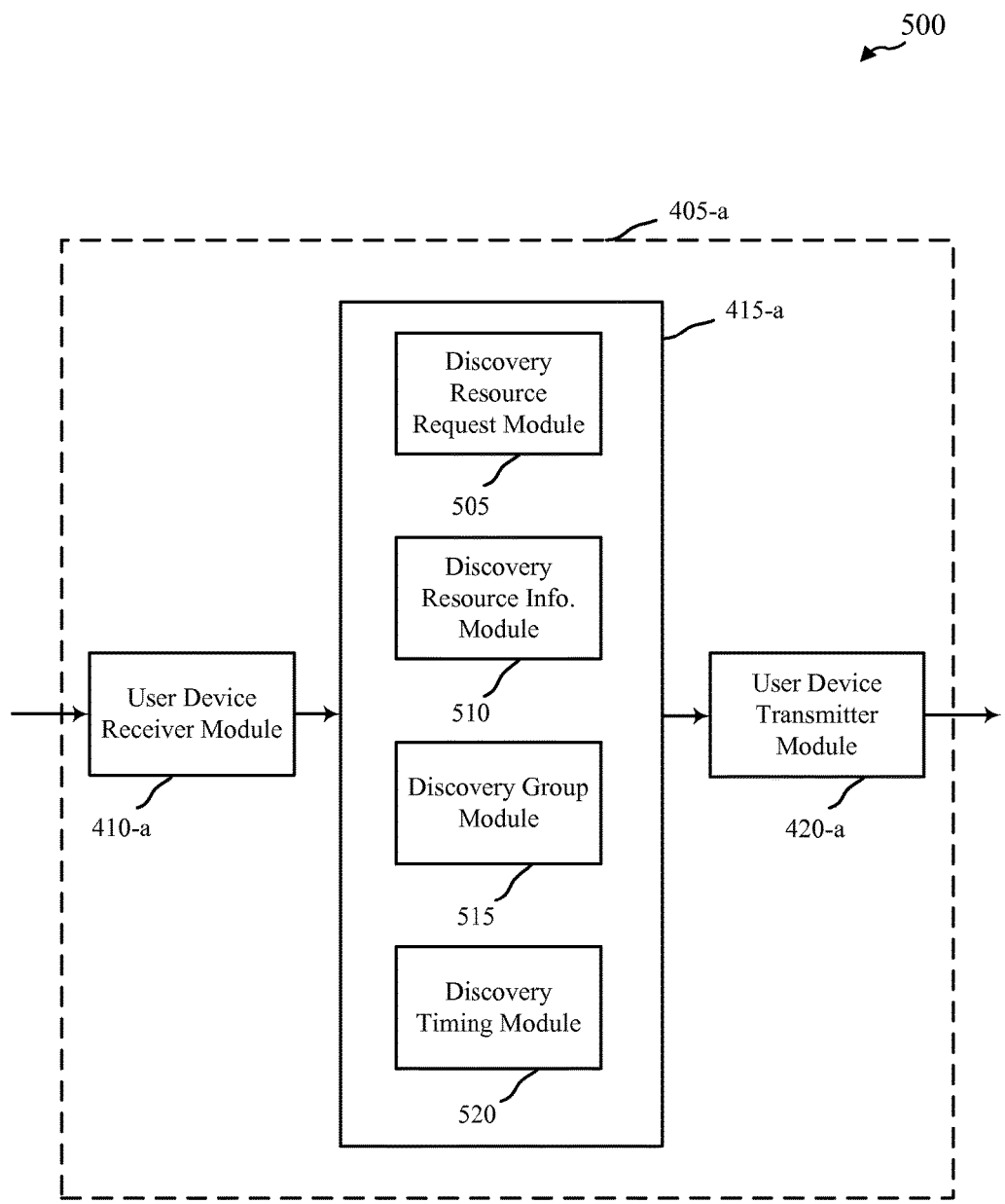
FIG. 5 is a block diagram of an example of a device-to-device discovery module in a user device, in accordance with various embodiments.

FIG. 5 shows a block diagram 500 that includes an apparatus 405-a, which may be an example of one or more aspects of the apparatus 405 (of FIG. 4) for use in wireless communication, in accordance with various aspects of the present disclosure. In some examples, the apparatus 405-a may include a user device receiver module 410-a and a user device transmitter module 420-a, which are examples of the user device receiver module 410 and user device transmitter module 420 of FIG. 4. In additional examples, the apparatus 405-a may include a user device D2D discovery module 415-a, which may be an example of one or more aspects of the user device D2D discovery module 415 of FIG. 4. In some examples, the user device D2D discovery module 415-a may include a discovery resource request module 505, a discovery resource information module 510, a discovery group module 515 and a discovery timing module 520. The modules 505, 510, 515, 520 may each be used in aspects of requesting, receiving, and applying D2D discovery resource information, as the information may be received in D2D discovery resource responses 310 (of FIG. 3). While FIG. 5 illustrates a specific example, the functions performed by each of the modules 505, 510, 515, 520 may be combined or implemented in one or more other modules.

The discovery resource request module 505 enables the apparatus 405-a (such as a user device 115) to request an allocation of D2D discovery resources from, for example, a base station via a D2D discovery resource request 305 (of FIG. 3). In an embodiment, the discovery resource request module 505 generates the D2D discovery resource request 305. For example, the discovery resource request module 505 may generate the D2D discovery resource request 305 as a new RRC message. The RRC message would include a request for D2D discovery resources. Alternatively, the discovery resource request module 505 may generate the D2D discovery resource request 305 as a modified buffer status report (BSR) message. The modified BSR message would include a new field to indicate that the message related to D2D discovery, thus differentiating the message from other BSR messages relating to wide area network (WAN) operations. The modified BSR message would include a request for D2D discovery resources. As an additional embodiment, the discovery resource request module 505 may generate the D2D discovery resource request 305 as a modified random-access channel (RACH) message. The modified RACH message would also include a new field to indicate that the message related to D2D discovery and not to WAN operations. The modified RACH message would include a request for D2D discovery resources.

The generated D2D discovery resource request 305 may or may not include additional information other than a request. For example, the D2D discovery resource request 305 may indicate that the apparatus 405-a (e.g., the user device 115) is authorized to participate in D2D discovery. As another example, if the apparatus 405-a (e.g., the user device 115) does not currently have any valid allocated D2D discovery resources or if the apparatus 405-a is currently allocated Type I (common) D2D discovery resources, the D2D discovery resource response 310 may be empty. The apparatus 405-a may not have any currently valid allocated D2D discovery resources if the D2D discovery resource request 305 has been rejected. Alternatively, the D2D discovery resource request 305 may include information related to currently allocated D2D discovery resources and their source. The inclusion of currently allocated D2D discovery resources and their source in the D2D discovery resource request 305 may be beneficial when, for example, the apparatus 405-a (e.g., the user device 115) moves from one base station 105 coverage area 110 (of FIGS. 1 and/or 2) to another, and can thus inform a new target base station 105 of the D2D discovery resources previously allocated by a source base station 105. The target base station 105 may then communicate with the source base station 105, as explained in greater detail below with respect to base stations 105 implementing the described embodiments.

In some instances, the D2D discovery resource request 305 may include an indicator that indicates that the apparatus 405-a is authorized to participate in D2D discovery. Alternatively, once the D2D discovery resource request 305 is received by a base station, a connected mobility management entity (MME) may indicate to the base station that the apparatus 405-a is authorized to participate in D2D discovery.

In some instances, the apparatus 405-a (e.g., the user device 115) may require D2D discovery resource allocation for more than one D2D discovery message or expression. In such a case, the apparatus 405-a may need to submit more than one D2D discovery resource request 305. Alternatively, the D2D discovery resource request 305 may include an indicator of how many D2D discovery resource allocations are required by the apparatus 405-a. In some instances, the various D2D discovery messages may be allocated different types of D2D discovery resources. If the apparatus 405-a determines in advance that some of the to-be allocated D2D discovery resources are to be common (Type 1) while others are to be dedicated (Type 2), the discovery resource request module 505 can include that information in the D2D discovery resource request 305.

In response to the D2D discovery resource request 305, a base station 105 may allocate D2D discovery resources to a user device 115 either autonomously of after communicating with a connected MME. A base station 105 may, when allocating D2D discovery resources to a user device 115, also notify an MME of the allocated D2D discovery resources. Such notification may be in the form of an expression index. Alternatively, the MME can already have information regarding allocations to a user device 115. In this scenario, when a user device 115 transmits to a base station 105 a D2D discovery resource request 305, the base station 105 then queries a connected MME and then allocates D2D discovery resources in accordance with the MME. In another alternative, a connected MME can inform a base station 105 that a requesting user device 115 may be allocated specific common and dedicated D2D discovery resources. The information, as returned from the MME, may be communicated as an expression index for both common and dedicated D2D discovery resources. If one or more D2D discovery resources are to be dedicated to a user device 115, then a radio resource ID for the dedicated resources may be provided.

The user device D2D discovery module 415-a may also include the discovery resource information module 510. The discovery resource information module 510 may store information relating to current D2D discovery resources used by the apparatus 415-a (e.g., the user device 115). For example, the discovery resource information module 510 may store the D2D discovery resource allocation, as received from a base station 105 via a D2D discovery resource response 310 (of FIG. 3). The information stored may include the actual D2D discovery resource allocation and the type of allocation. In the case of a Type 1 D2D discovery resource allocation, the information identifying the D2D discovery resource allocation may include simply a number or number of subframes commonly allocated within the D2D discovery resource pool.

In the case of a Type 2 D2D discovery resource allocation, the information identifying the D2D discovery resource allocation may include, in one embodiment, a start and an end resource block (RB) and a subframe number within the allocated D2D discovery resource pool. Alternatively, the information identifying the D2D discovery resource allocation may instead include a start RB and a length of RBs (representing a number of RBs allocated, beginning with the start RB), as well as the subframe number within the allocated D2D discovery resource pool. In another embodiment, the information identifying the D2D discovery resource allocation may include an index of discovery resources along with the subframe number within the allocated D2D discovery resource pool.

In the case of a Type 2B D2D discovery resource allocation, the information identifying the D2D discovery resource allocation may include a duration for which the allocated resources are available for use by the apparatus 405-$a$ (e.g., the user device 115). For example, the duration of use may be indicated as a number of times that the allocated discovery resources may be used. Alternatively, the duration of use may be indicated as a time duration during which the allocated discovery resources may be used.

As another example, the discovery resource information module 510 may store the type of D2D discovery resource allocation (e.g., Type 1 or Type 2). Further, the discovery resource information module 510 may store an identifier of the base station 105 that made the current allocation of D2D discovery resources.

The discovery resource information module 510 may store information. The information stored by the discovery resource information module 510 may be received by the apparatus 405-$a$ (e.g., the user device 115) in the form of a D2D discovery resource response 310 (of FIG. 3). Additionally, the discovery resource information module 510 may provide some or all of the stored information to the discovery resource request module 505 to be included in any request made to a base station 105. In particular, the inclusion of currently allocated D2D discovery resources and their source (e.g., an identifier of the base station 105 which made the current allocation) in a D2D discovery resource request 305 generated by the discovery resource request module 505 may be beneficial when, for example, the apparatus 405-$a$ (e.g., the user device 115) moves from one base station 105 coverage area 110 (of FIGS. 1 and/or 2) to another, and can thus inform a new target base station 105 of the D2D discovery resources previously allocated by a source base station 105. The target base station 105 may then communicate with the source base station 105, as explained in greater detail below with respect to base stations 105 implementing the described embodiments.

The user device D2D discovery module 415-$a$ may also include a discovery group module 515. The discovery group module 515 may store information relating to base stations 105 included within a group of base stations 105 that each allocated the same D2D discovery resources to the apparatus 405-$a$ (e.g., the user device 115). Thus, if the apparatus 405-$a$ is moved to a different coverage area 110 (see FIGS. 1 and/or 2), the apparatus 405-$a$ need not request updated D2D discovery resources. Instead, the apparatus 405-$a$ may check the information stored within the discovery group module 515. If the new or target base station 105 is identified to be within the group of base stations 105 that has allocated the same D2D discovery resources to the apparatus 405-$a$, then the apparatus 405-$a$ need not request an updated allocation of D2D discovery resources.

The discovery group module 515 may store the base station group information as it is received from a base station 105. In one embodiment, the discovery group module 515 receives an indicator in a SIB message that represents the group number that is associated with a base station 105. All base stations 105 sharing the same group number will allocate the same D2D discovery resources to the apparatus 405-$a$. Alternatively, the discovery group module 515 may receive an identifier of each base station in proximity to a source base station 105 and that has allocated the same D2D discovery resources to the apparatus 405-$a$. In another embodiment, the discovery group module 515 receives an indicator that the group of base stations 105 allocating the same D2D discovery resources to the apparatus 405-$a$ is the same as a tracking area use for paging.

The apparatus 405-$a$ may use the received group information in order to limit a number of D2D discovery resource requests that the apparatus makes and also to facilitate the release of previously allocated D2D discovery resources. For example, if the apparatus 405-$a$ is moved into the coverage area of a base station 105 that is a member of a group of base stations 105 that are each allocating the same D2D discovery resources to the apparatus 405-$a$, the apparatus 405-$a$ need not request additional D2D discovery resources. However, if the apparatus 405-$a$ is moved to a coverage area 110 that is outside of this group, the apparatus 405-$a$ may need to request additional D2D discovery resources from a new target base station 105. When the target base station 105 receives the request for D2D discovery resources, the target base station 105 may inform the source base station 105 or all of the base stations 105 in the group that includes the source base station 105, so that the previously allocated D2D discovery resources may be released. Alternatively, the target base station 105 can communicate with the source base station 105 and the source base station can then communicate with all other base stations 105 within its group so that every base station 105 in the group can release the previously allocated resources. As a further alternative, the target base station 105 can inform an MME and the MME can notify each base station 105 in the group of the source base station 105 that the D2D discovery resources are to be released.

The user device D2D discovery module 415-$a$ may also include a discovery timing module 520. The discovery timing module 520 may include instructions and/or indicators that govern when an allocated discovery resource may be used with respect to current or future discovery windows. The illustration of FIG. 11 is beneficial to understand the function of the discovery timing module 520.

Figure 11:
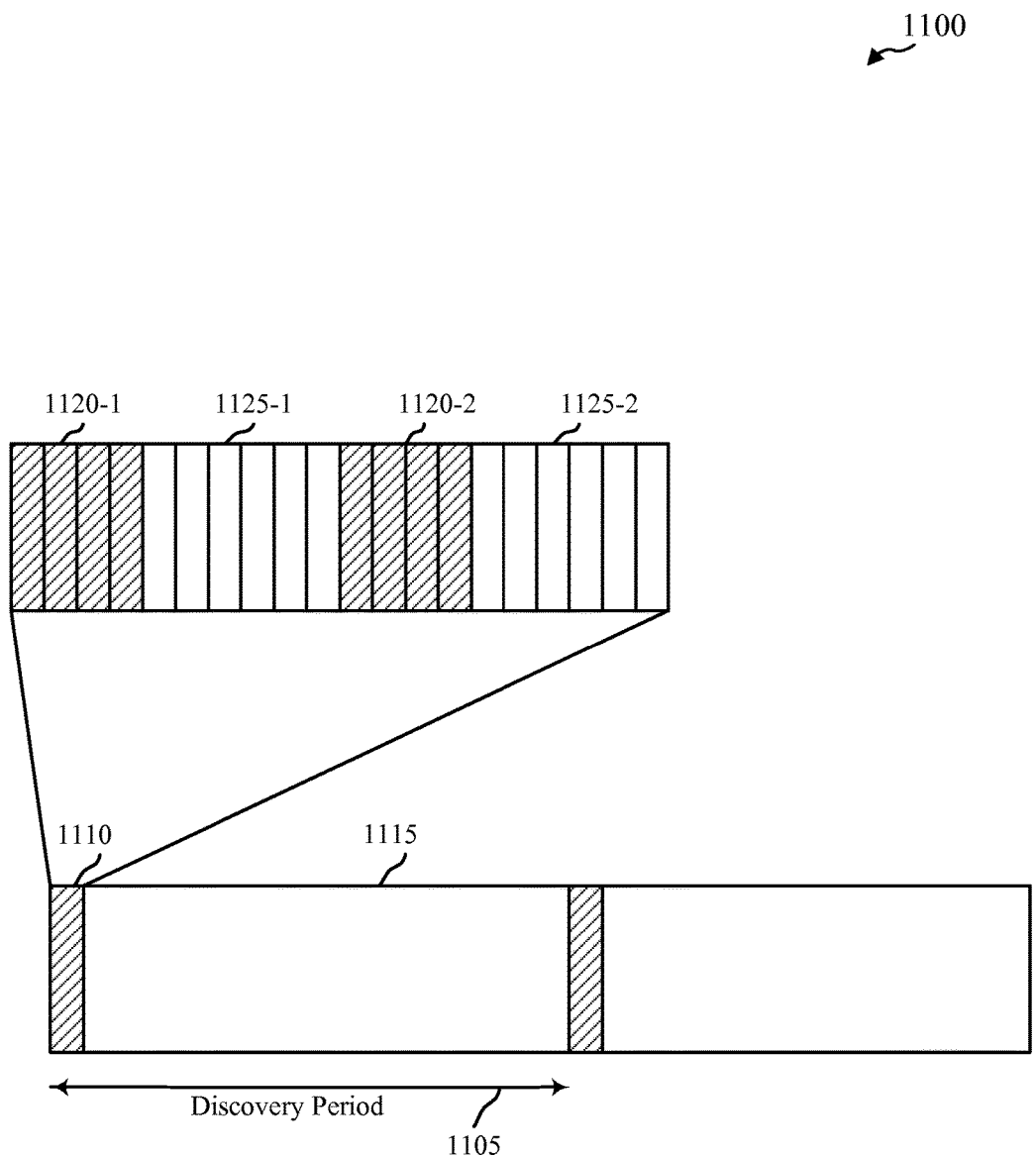
FIG. 11 is a block diagram illustrating device-to-device discovery resources, in accordance with various embodiments.

FIG. 11 shows a block diagram illustrating device-to-device discovery resources. As illustrated in FIG. 11, resources 1100 may be allocated for D2D discovery as well as for network communications. Thus, the resources 1100 illustrated in FIG. 11 may be examples of resources used during any of the communications between user devices 115 and base stations 105, as described with respect to FIGS. 1, 2, and/or 3. These resources may be organized into a periodically-available discovery period 1105. The discovery period 1105 may include a discovery window 1110 followed by a non-discovery window 1115.

Typically, the non-discovery window 1115 is much larger/longer than the discovery window 1110, as the non-discovery window 1115 facilitates non-discovery operations such as WAN operations. The discovery window 1110 is only a small fraction of the entire discovery period 1105. The discovery window 1110 itself is comprised of both discovery subframes 1120-1, 1120-2 and non-discovery subframes 1125-1, 1125-2. The discovery subframes 1120-1, 1120-2 may be allocated for use in D2D discovery. The non-discovery subframes 1125-1, 1125-2 may be reserved for non-discovery-related communications such as WAN operations. Thus, in any given discovery period 1105, D2D discovery operations may only occur within a relatively small discovery window 1110, and only within certain discovery subframes 1120-1, 1120-2 of the discovery window 1110.

Now, returning to the discovery timing module 520 of FIG. 5, the discovery timing module 520 governs when an allocated discovery resource may be used with respect to current or future discovery windows. If the apparatus 405-*a* receives a D2D discovery resource response 310 (of FIG. 3) during a time that is outside of a discovery window 1110 (of FIG. 11), then the discovery timing module 520 determines when the allocated D2D discovery resources should be used. Generally, if the apparatus 405-*a* receives a D2D discovery resource response 310 outside of a discovery window 1110, then the discovery timing module 520 determines that the allocated resources are effective during the immediate next discovery window 1110. If the apparatus 405-*a* receives a D2D discovery resource response 310 within a discovery window 1110, then the discovery timing module 520 determines that the allocated resources are also effective during the immediate next discovery window 1110.

As an alternative, if the D2D discovery resource response 310 is received before a predetermined threshold time, then the discovery timing module 520 determines that the allocated resources are effective immediately, regardless of whether the D2D discovery resource response 310 is received within or outside of a discovery window 1110. The predetermined threshold time may be communicated to the apparatus 405-*a*, for example, as a parameter in a SIB message or in some other dedicated message.

In yet another embodiment, activation of allocated D2D discovery resources may require receipt of a new or existing downlink control information (DCI) format physical level signal. If the apparatus 405-*a* receives the DCI signal during a time that is outside of a discovery window 1110, then the discovery timing module 520 determines that the allocated resources are effective during the immediate next discovery window 1110. If the apparatus 405-*a* receives the activating DCI signal within a discovery window 1110, then the discovery timing module 520 determines that the allocated resources are also effective during the immediate next discovery window 1110.

As a further alternative, if the activating DCI signal is received before a predetermined threshold time, then the discovery timing module 520 determines that the allocated resources are effective immediately, regardless of whether the DCI signal is received within or outside of a discovery window 1110. The predetermined threshold time may be communicated to the apparatus 405-*a*, for example, as a parameter in a SIB message or in some other dedicated message.

Figure 6:
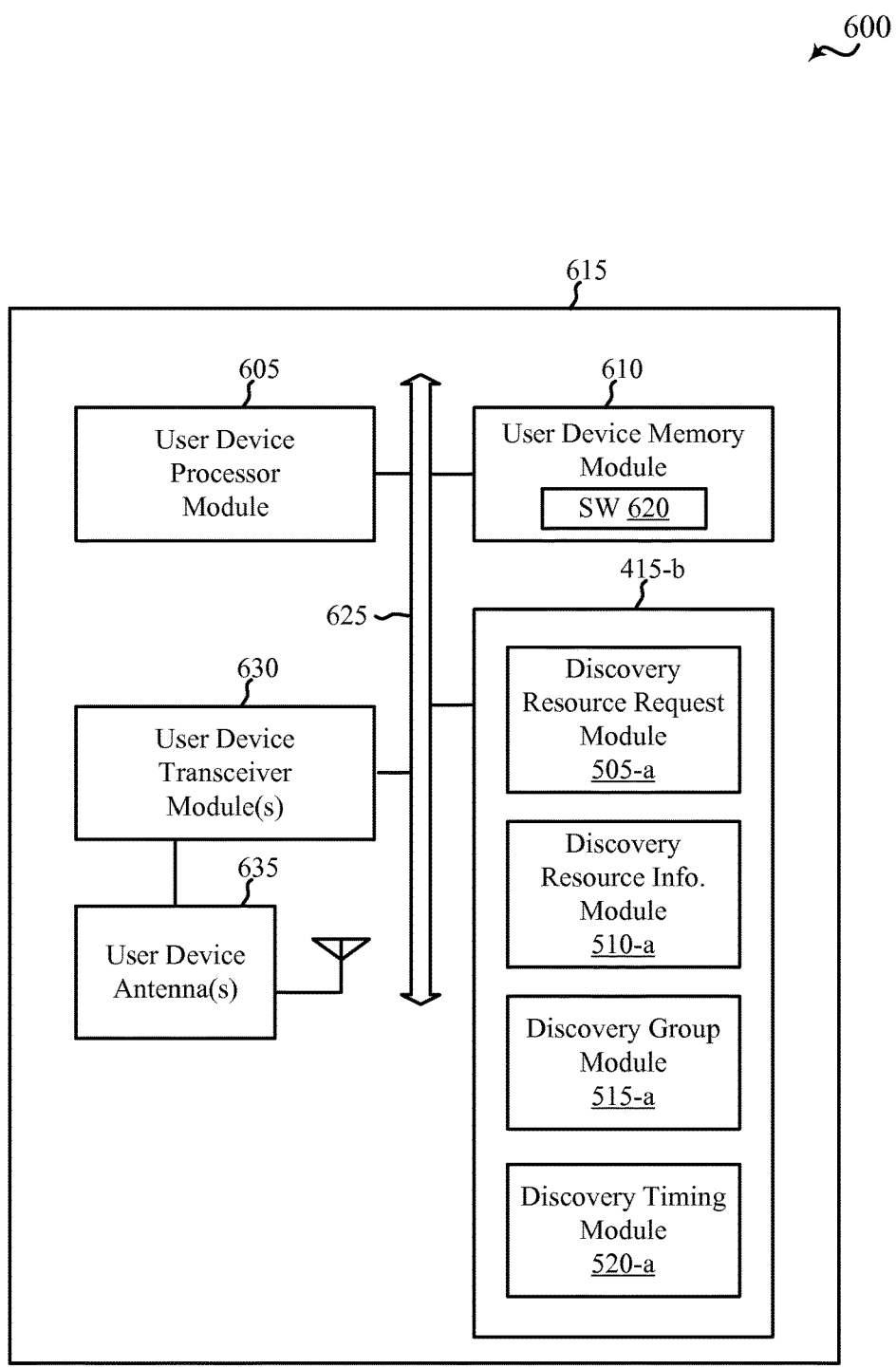
FIG. 6 is a block diagram of an example of a user device, in accordance with various embodiments.

FIG. 6 shows a block diagram 600 of a user device 615 for use in wireless communication, in accordance with various aspects of the present disclosure. The user device 615 may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, or the like. The user device 615 may, in some examples, have an internal power supply, such as a small battery, to facilitate mobile operation. In some examples, the user device 615 may be an example of one or more aspects of one of the user devices 115 or apparatus 405 described with reference to FIGS. 1, 2, 3, 4, and/or 5. The user device 615 may be configured to implement at least some of the features and functions described with reference to FIGS. 1, 2, 3, 4, and/or 5.

The user device 615 may include a user device processor module 605, a user device memory module 610, at least one user device transceiver module (represented by user device transceiver module(s) 630), at least one user device antenna (represented by user device antenna(s) 635), or a user device D2D discovery module 415-*b*. Each of these components may be in communication with each other, directly or indirectly, over one or more user device buses 625.

The user device memory module 610 may include random access memory (RAM) or read-only memory (ROM). The user device memory module 610 may store computer-readable, computer-executable user device software (SW) code 620 containing instructions that are configured to, when executed, cause the user device processor module 605 to perform various functions described herein for communicating, for example, discovery-related messages. Alternatively, the user device software code 620 may not be directly executable by the user device processor module 605 but be configured to cause the user device 615 (e.g., when compiled and executed) to perform various of the functions described herein.

The user device processor module 605 may include an intelligent hardware device, e.g., a CPU, a microcontroller, an ASIC, or the like. The user device processor module 605 may process information received through the user device transceiver module(s) 630 or information to be sent to the user device transceiver module(s) 630 for transmission through the user device antenna(s) 635. The user device processor module 605 may handle, alone or in connection with the user device D2D discovery module 415-*b*, various aspects of transmitting, receiving, and managing D2D discovery signaling.

The user device transceiver module(s) 630 may include a modem configured to modulate packets and provide the modulated packets to the user device antenna(s) 635 for transmission, and to demodulate packets received from the user device antenna(s) 635. The user device transceiver module(s) 630 may, in some examples, be implemented as one or more transmitter modules and one or more separate receiver modules. The user device transceiver module(s) 630 may support discovery-related communications. The user device transceiver module(s) 630 may be configured to communicate bi-directionally, via the user device antenna(s) 635, with one or more of the base stations 105 described with reference to FIG. 1, 2, or 3. While the user device 615 may include a single antenna, there may be examples in which the user device 615 may include multiple user device antennas 635.

The user device D2D discovery module 415-*b* may be configured to perform or control some or all of the features or functions described with reference to FIG. 1, 2, 3, 4, or 5 related to D2D discovery. For example, the user device D2D discovery module 415-*b* may be configured to support transmission and receipt of D2D discovery resource requests and responses, as well as management of the D2D discovery enabled by the D2D discovery resource requests and responses. In some examples, and by way of example, the user device D2D discovery module 415-*b* may be an example of one or more aspects of the user device D2D discovery module 415 described with reference to FIG. 4 or 5. The user device D2D discovery module 415-*b* may include a discovery resource request module 505-*a* (which may be an example of the discovery resource request module 505 of FIG. 5), a discovery resource information module 510-*a* (which may be an example of the discovery resource information module 510 of FIG. 5), a discovery group module 515-*a* (which may be an example of the discovery group module 515 of FIG. 5), and a discovery timing module 520-*a* (which may be an example of the discovery timing module 520 of FIG. 5). The user device D2D discovery module 415-*b*, or portions of it, may include a processor, or some or all of the functions of the user device D2D discovery module 415-*b* may be performed by the user device processor module 605 or in connection with the user device processor module 605. Additionally, the user device D2D discovery module 415-*b*, or portions of it, may include a memory, or some or all of the functions of the user device D2D discovery module 415-*b* may use the user device memory module 610 or be used in connection with the user device memory module 610.

Figure 7:
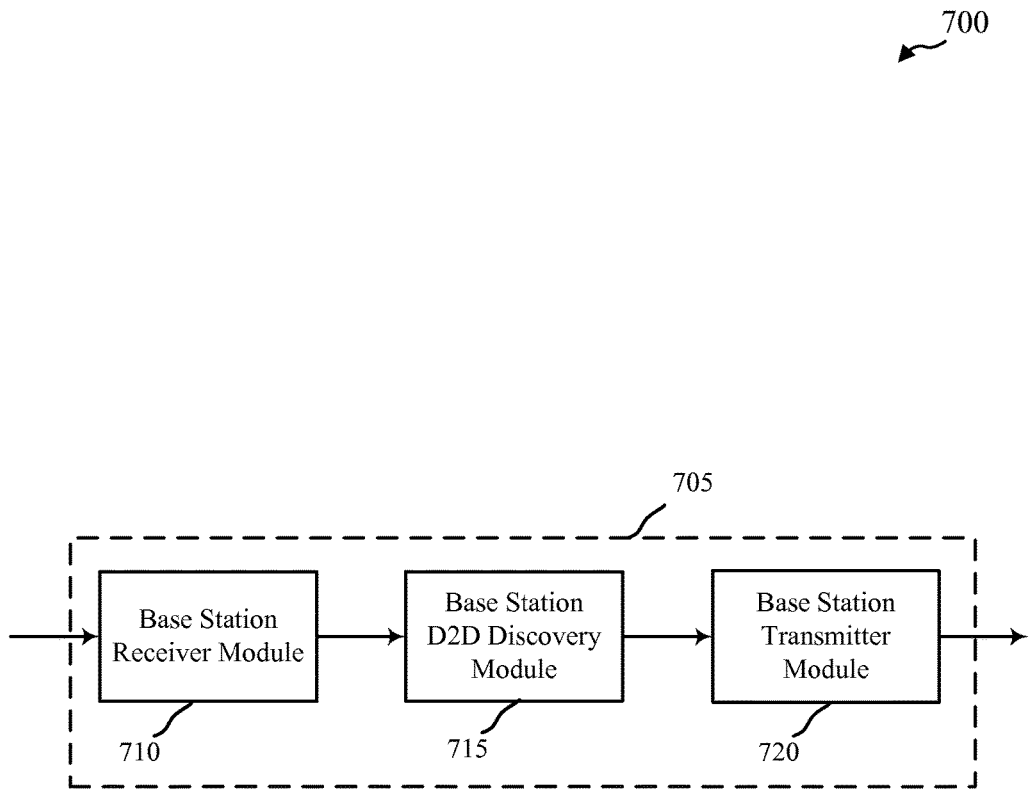
FIG. 7 is a block diagram of an example of a base station, in accordance with various embodiments.

FIG. 7 is an example of a block diagram 700 of an apparatus 705 for use in wireless communication, in accordance with various aspects of the present disclosure. In some examples, the apparatus 705 may be an example of aspects of one or more of the base stations 105 described with reference to FIG. 1, 2, or 3. The apparatus 705 may also be a processor. The apparatus 705 may include a base station receiver module 710, a base station D2D discovery module 715, and a base station transmitter module 720. Each of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the base station receiver module 710 may include at least one radio frequency receiver, such as at least one RF receiver operable to receive transmissions over a radio frequency spectrum. In some examples, the radio frequency spectrum may be used for LTE/LTE-A communications, as described, for example, with reference to FIGS. 1 and 2. The base station receiver module 710 may be used to receive various types of data or control signals (i.e., transmissions) over one or more communication links of a wireless communications system, such as one or more communication links 125, 134 of the wireless communications system 100 described with reference to FIG. 1 or 2. Examples of the types of data or control signals received by the base station receiver module 710 include the D2D discovery resource request 305 described with reference to FIG. 3.

In some examples, the base station transmitter module 720 may include at least one RF transmitter, such as at least one RF transmitter operable to transmit D2D discovery resource messages. The base station transmitter module 720 may be used to transmit various types of data or control signals (i.e., transmissions) over one or more communication links of a wireless communications system, such as one or more communication links 125, 134 of the wireless communications system 100 described with reference to FIG. 1 or 2. Examples of the types of data or control signals transmitted by the base station transmitter module 720 include the D2D discovery resource response 310 described with reference to FIG. 3.

In some examples, the base station D2D discovery module 715 may be used to manage the receipt of D2D discovery resource requests 305 and the transmission of D2D discovery resource responses 310 (see FIG. 3) via the base station receiver module 710 and/or the base station transmitter module 720. Managing the receipt and transmission of D2D discovery resource requests and responses may include receiving from a user device 115 a request for D2D discovery resources, transmitting to a user device 115 an allocation of D2D discovery resources of a specific type as well as related information, and, in certain scenarios, forwarding information regarding a user device 115 and its allocated D2D discovery resources to other base stations 105.

Figure 8:
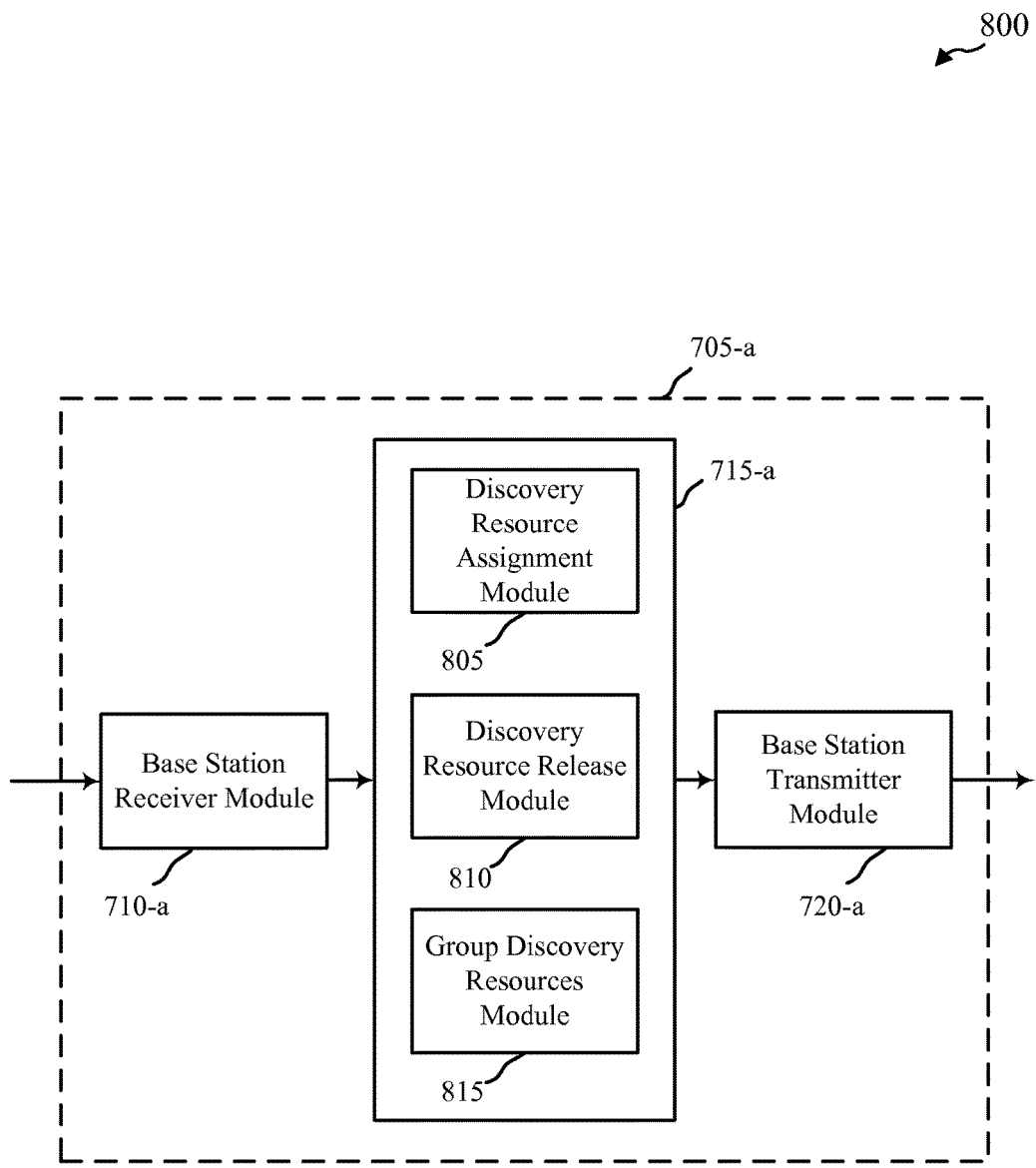
FIG. 8 is a block diagram of an example of a device-to-device discovery module in a base station, in accordance with various embodiments.

FIG. 8 shows a block diagram 800 that includes apparatus 705-*a*, which may be an example of one or more aspects of the apparatus 705 (of FIG. 7) for use in wireless communication, in accordance with various aspects of the present disclosure. In some examples, the apparatus 705-*a* may include a base station receiver module 710-*a* and a base station transmitter module 720-*a*, which are examples of the base station receiver module 710 and base station transmitter module 720 of FIG. 7. In additional examples, the apparatus 705-*a* may include a base station D2D discovery module 715-*a*, which may be an example of one or more aspects of the base station D2D discovery module 715 of FIG. 7. In some examples, the base station D2D discovery module 715-*a* may include a discovery resource assignment module 805, a discovery resource release module 810, and a group discovery resources module 815. The modules 805, 810, 815 may each be used in aspects of receiving and responding to requests for D2D discovery resources in the form of D2D discovery resource requests 305 and D2D discovery resource responses 310 (of FIG. 3). While FIG. 8 illustrates a specific example, the functions performed by each of the modules 805, 810, 815 may be combined or implemented in one or more other modules.

The discovery resource assignment module 805 enables the apparatus 705-*a* (such as a base station 105) to allocate D2D discovery resources in response to a request for the same. In an embodiment, the apparatus 705-*a* receives a D2D discovery resource request 305 (see FIG. 3) from a user device 115 which includes a request for D2D discovery resources. The D2D discovery resource request 305 may also include information pertaining to a current allocation of D2D discovery resources allocated to the user device 115. The D2D discovery resource request 305 may also include an identification of the user device 115, as well as an identification of the source base station 105 which allocated the currently allocated D2D discovery resources. The D2D discovery resource request 305 may include other information, as described above, and may be in any of the formats or message types also described above.

In an embodiment, the discovery resource assignment module 805 receives the D2D discovery resource request 305 and generates a response in the form of a D2D discovery resource response 310. The generated D2D discovery resource response 310 may be in many forms. In one embodiment, the D2D discovery resource response 310 is either a new or a modified RRCConnectionReconfiguration message. The new or modified RRCConnectionReconfiguration message includes additional parameters or fields in order to carry the necessary D2D discovery resource response and to differentiate the new or modified RRCConnectionReconfiguration message from an unmodified RRCConnectionReconfiguration message. The new or modified RRCConnectionReconfiguration message includes an indicator of whether the user device is to be allocated Type 1 or Type 2 D2D discovery resources. The new or modified RRCConnectionReconfiguration message may also include information identifying the D2D discovery resources allocated to the user device 115. For example, for a Type 1 allocation, the included identifying information may be an identification of the subframe numbers available for D2D discovery. For a Type 2 allocation, the included identifying information may be in the form of a start RB and an end RB, in addition to a subframe number within the allocated discovery resource pool. As an alternative, for a Type 2 allocation, the included identifying information may be in the form of a start RB and a length of RBs to be allocated, in addition to a subframe number within the allocated discovery resource pool. Alternatively, for a Type 2 allocation, the included identifying information may be in the form of an index of discovery resources along with a particular subframe number within the allocated discovery resource pool. Additionally, for a Type 2 B allocation, the D2D discovery resource response 310 may include a duration for which the dedicated D2D discovery resources have been allocated for use by the user device 115. The duration may be indicated in the form of either an allowable number of user device transmission times or a duration of time.

In another embodiment, the D2D discovery resource response 310 is either a new or a modified DCI message granting D2D transmission resource allocation for uplink. The new or modified DCI message includes additional parameters or fields in order to carry the necessary D2D discovery resource response and to differentiate the new or modified DCI message from an unmodified DCI message. The new or modified DCI message includes an indicator of whether the user device 115 is to be allocated Type 1 or Type 2 D2D discovery resources. The new or modified DCI message may also include information identifying the D2D discovery resources allocated to the user device 115. For example, for a Type 1 allocation, the included identifying information may be an identification of the subframe numbers available for D2D discovery. For a Type 2 allocation, the included identifying information may be in the form of a start RB and an end RB, in addition to a subframe number within the allocated discovery resource pool. As an alternative, for a Type 2 allocation, the included identifying information may be in the form of a start RB and a length of RBs to be allocated, in addition to a subframe number within the allocated discovery resource pool. Alternatively, for a Type 2 allocation, the included identifying information may be in the form of an index of discovery resources along with a particular subframe number within the allocated discovery resource pool. Additionally, for a Type 2B allocation, the D2D discovery resource response 310 may include a duration for which the dedicated D2D discovery resources have been allocated for use by the user device 115. The duration may be indicated in the form of either an allowable number of user device transmission times or a duration of time.

In yet another embodiment, the D2D discovery resource response 310 may be any of an RRC, MAC level, or PHY level message that includes the D2D discovery resource information. The RRC, MAC level, or PHY level message includes an indicator of whether the user device 115 is to be allocated Type 1 or Type 2 D2D discovery resources. The RRC, MAC level or PHY level message may also include information identifying the D2D discovery resources allocated to the user device 115. For example, for a Type 1 allocation, the included identifying information may be an identification of the subframe numbers available for D2D discovery. For a Type 2 allocation, the included identifying information may be in the form of a start RB and an end RB, in addition to a subframe number within the allocated discovery resource pool. As an alternative, for a Type 2 allocation, the included identifying information may be in the form of a start RB and a length of RBs to be allocated, in addition to a subframe number within the allocated discovery resource pool. Alternatively, for a Type 2 allocation, the included identifying information may be in the form of an index of discovery resources along with a particular subframe number within the allocated discovery resource pool. Additionally, for a Type 2B allocation, the D2D discovery resource response 310 may include a duration for which the dedicated D2D discovery resources have been allocated for use by the user device 115. The duration may be indicated in the form of either an allowable number of user device transmission times or a duration of time.

In a further embodiment, the D2D discovery resource response 310 may further include an activation signal in the form of a PHY level signal using either new or modified DCI formatted messages. The new or modified DCI formatted messages may include additional parameters or fields in order to differentiate the new or modified DCI formatted messages from an unmodified DCI formatted message. The new or modified DCI formatted messages could be used when the allocated D2D discovery resources are Type 2B resources, where the new or modified DCI formatted messages indicate activation of the allocated D2D discovery resources.

In one embodiment, the D2D discovery resource response 310 may be empty, thus indicating to a user device 115 that the allocated D2D discovery resources are of Type 1. Alternatively, the D2D discovery resource response 310 may only include an indication that the allocated D2D discovery resources are of Type 1.

In an additional embodiment, the D2D discovery resource response 310 may include a predetermined threshold time for which, if the D2D discovery resource response 310 is received by a user device 115 before the predetermined threshold time, then the allocated resources are effective for the user device 115 immediately, regardless of whether the D2D discovery resource response 310 is received within or outside of a discovery window 1110 (of FIG. 11). The predetermined threshold time may also be communicated to a user device 115, for example, as a parameter in a SIB message or in some other dedicated message.

In yet another embodiment, the D2D discovery resource response 310 may also include an activation signal in the form of a new or existing DCI format PHY level signal, as well as an indication of a predetermined threshold time for the activation signal to be applied. If a user device 115 receives the new or existing DCI format PHY level activation signal before the predetermined threshold time, then the allocated resources are effective for the user device 115 immediately, regardless of whether the D2D discovery resource response 310 is received within or outside of a discovery window 1110 (of FIG. 11). The predetermined threshold time may also be communicated to a user device 115, for example, as a parameter in a SIB message or in some other dedicated message.

In some instances, the discovery resource assignment module 805 may receive a D2D discovery resource request requiring D2D discovery resource allocation for a single user device 115 needing more than one D2D discovery message or expression. In such a case, the discovery resource assignment module 805 may generate a D2D discovery resource response 310 that includes an allocation of D2D discovery resources corresponding to each D2D discovery message or expression expected to be used by the user device 115. In some instances, different types of D2D discovery resources are allocated for the different D2D discovery messages or expressions. The different allocations may be provided using an expression index, for example.

In another instance, when the discovery resource assignment module 805 receives a request for multiple D2D discovery resource allocations for the same user device 115, the discovery resource assignment module 805 may query a connected MME, which may have information regarding a number and type of expressions that may be allocated to a particular user device 115. This information may be stored at the MME or conveyed to the apparatus 705-a (e.g., the base station 105) as an expression index. The discovery resource assignment module 805 may then allocate D2D discovery resources in accordance with the information received from the MME.

In an additional embodiment, discovery resource assignment module 805 need not wait to receive a D2D discovery resource request 305 from a user device 115. If the discovery resource assignment module 805 is already aware of a user device 115, the discovery resource assignment module 805 may allocate D2D discovery resources to the user device 115 without waiting for a D2D discovery resource request 305. In this case, the allocation of D2D discovery resources to the user device 115 may occur through any one of the D2D discovery resource response 310 configurations described above.

The base station D2D discovery module 715-a may also include the discovery resource release module 810. The discovery resource release module 810 may facilitate communications with other base stations 115 in order to allow those other base stations 115 to release previously allocated D2D discovery resources. For example, when the discovery resource assignment module 805 receives a D2D discovery resource request 305 that includes information pertaining to D2D discovery resources previously allocated to a user device 115 by a source base station 105, the discovery resource release module 810 can send a message to the source base station 105 to notify the source base station 105 that the source base station 105 can release the allocated resources. This scenario is described in more detail with relation to FIG. 10.

Figure 10:
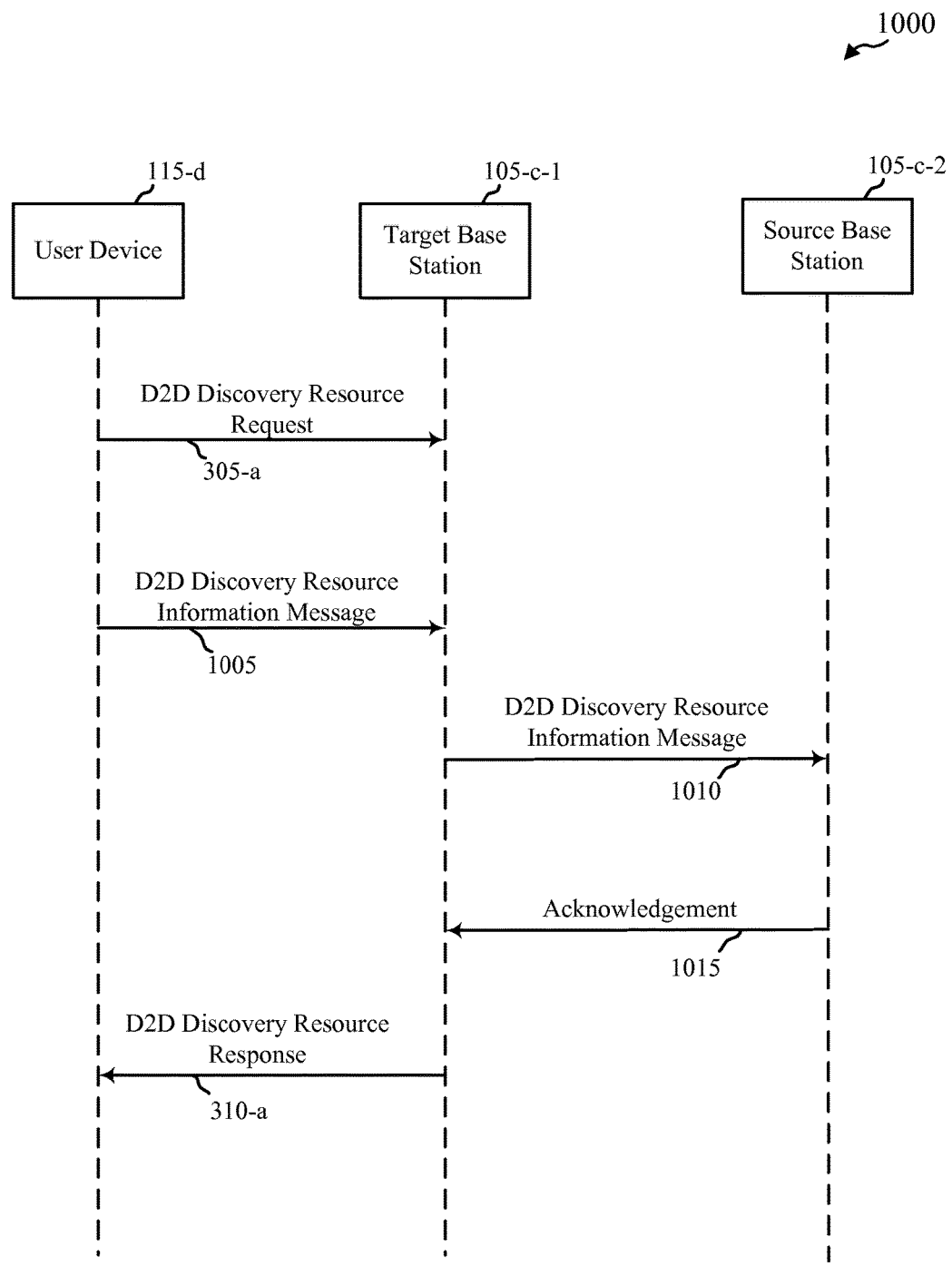
FIG. 10 is a message flow diagram illustrating communications between a user device and base stations engaging in device-to-device discovery, in accordance with various embodiments.

FIG. 10 is a message flow diagram 1000 illustrating an embodiment of D2D discovery communications between a user device 115-d and two base stations 105-c-1, 105-c-2. The user device 115-d and base stations 105-c may be examples of the user devices 115 and base stations 105 described in FIG. 1, 2, or 6, as well as the apparatuses 405, 705, respectively, described in FIG. 4, 5, 7, or 8. In FIG. 10, the user device 115-d, which has been participating in D2D discovery and already has D2D discovery resources allocated to it by a source base station 105-c-2, is moved out of the coverage area 110 (see, e.g., FIG. 1 or 2) of the source base station 105-c-2 and into the coverage area 110 of a target base station 105-c-1. Thus, the user device 115-d may need to have D2D discovery resources reallocated by the target base station 105-c-1. To that end, the user device 115-d transmits to the target base station 105-c-1 a D2D discovery resource request 305-a. The D2D discovery resource request 305-a may be an example of the D2D discovery resource request 305 explained with reference to FIG. 3 and used as described with reference to FIG. 4, 5, 6, 7, or 8. As part of the D2D discovery resource request 305-a, or as a separate D2D discovery resource information message 1005, the user device 115-d provides to the target base station 105-c-1 information pertaining to the D2D discovery resources previously allocated to the user device 115-d by the source base station 105-c-2. The information provided to the target base station 105-c-1 may include the actual allocation of D2D discovery resources as well as an identity of the source base station 105-c-2. The target base station 105-c-1 then relays the received information to the source base station 105-c-2 in a D2D discovery resource information message 1010, thus indicating to the source base station 105-c-2 that the D2D discovery resources previously allocated to the user device 115-d are available for reallocation (as the user device 115-d will receive an allocation of D2D discovery resources from the target base station 105-c-1). Upon receipt of the D2D discovery resource information message 1010, the source base station 105-c-2 may send an acknowledgment 1015 to the target base station 105-c-1. Additionally, once the target base station 105-c-1 has received the D2D discovery resource request 305-a, the target base station 105-c-1 may allocate D2D discovery resources to the user device 115-d via a D2D discovery resource response 310-a (which may be an example of the D2D discovery resource response 310 described with reference to FIG. 3 and use as described with reference to FIG. 4, 5, 6, 7, or 8).

Returning again to FIG. 8, the discovery resource release module 810 can facilitate the communication between the apparatus 705-a (e.g., the target base station 105-c-1 of FIG. 10) and a source base station 105-c-2 (of FIG. 10) to relay the previously allocated D2D discovery resources that may be released by the source base station 105-c-2. Thus, the discovery resource release module 810 is particularly beneficial when a user device 115 which has previously been allocated Type 2B D2D discovery resources, but that has transitioned into an idle state (e.g., an RRC-IDLE state), awakens into a connected state (e.g., an RRC_CONNECTED state) with a different base station 105. Thus, the user device 115 may need to request a reallocation of D2D discovery resources from the new (target) base station 105, while the old (source) base station 105 can, if notified, release the previously allocated D2D discovery resources.

The base station D2D discovery module 715-a may also include the group discovery resources module 815. The group discovery resources module 815 may store information relating to base stations 105 included within a group of base stations 105 that may each allocate the same D2D discovery resources to a user device 115. Thus, if a user device 115 is moved to a different coverage area 110 (see FIGS. 1 and/or 2), the user device 115 need not request updated D2D discovery resources from the apparatus 705-a (e.g., a base station 105).

The group discovery resources module 815 may store the base station group information, indicating which base stations 105 are coordinated as a group to assign the same D2D discovery resources to user devices 115. In one embodiment, the group discovery resources module 815 stores a group indicator that is transmitted to user devices 115 in a SIB message. The group indicator may be a number that represents all base stations 105 in the group. Thus, any base station 105 in the group may transmit its group number in the form of an SIB message. Alternatively, the group discovery resources module 815 may store an identifier of each base station 105 in proximity to the apparatus 705-a that has allocated the same D2D discovery resources to user devices 115, and may transmit to a user device 115 the identifiers of neighboring base stations 105 that in the group. In another embodiment, the group discovery resources module 815 stores an indicator that the group of base stations 105 allocating the same D2D discovery resources user devices 115 is the same as a tracking area use for paging.

Figure 9:
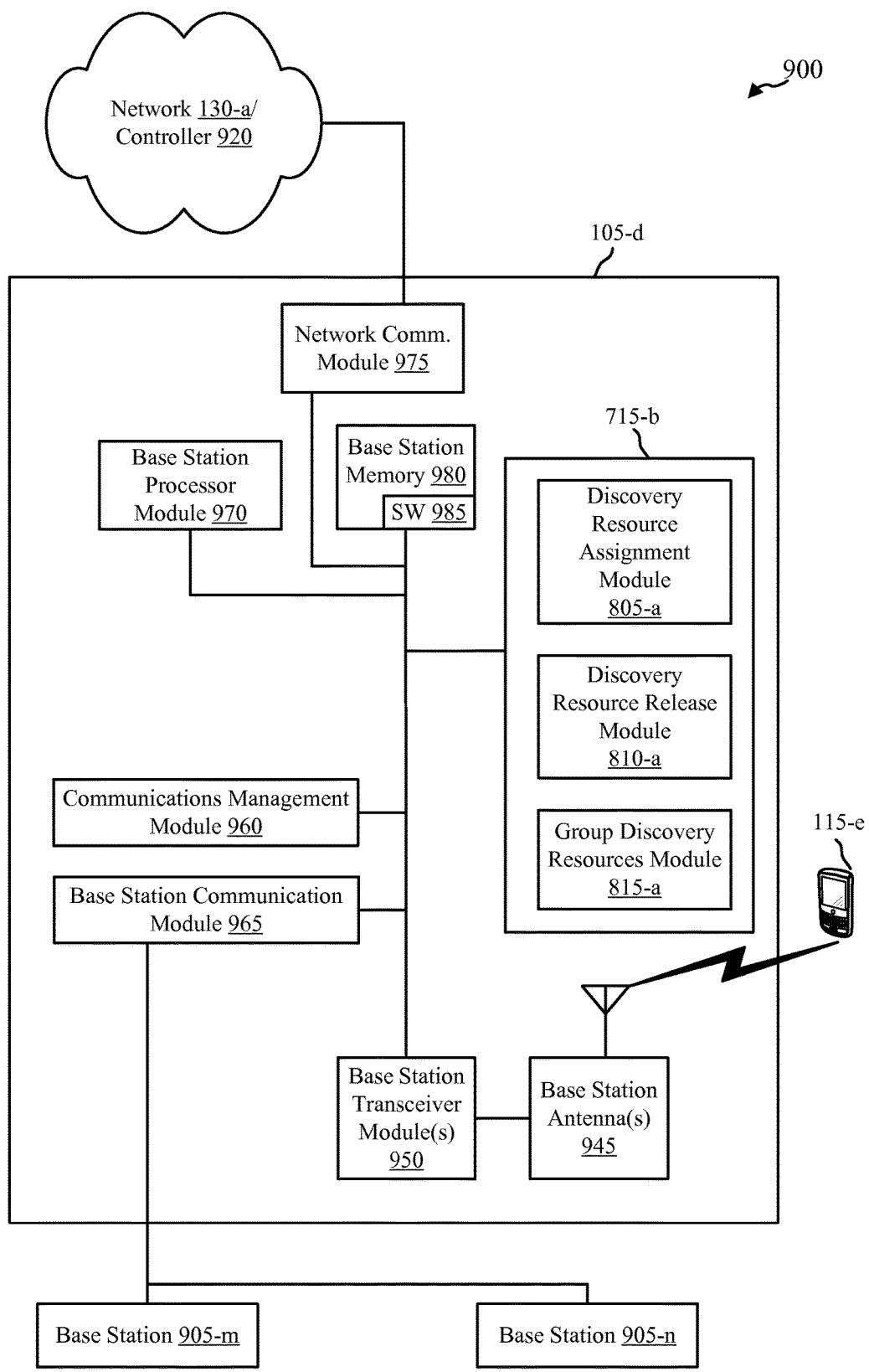
FIG. 9 is a block diagram of an example of a base station, in accordance with various embodiments.

FIG. 9 shows a block diagram of a communications system 900 that may be configured for use in receiving and transmitting D2D discovery resource requests and responses, in accordance with various aspects of the present disclosure. The system 900 may be an example of aspects of the systems 100, 200 depicted in FIG. 1 or 2, respectively, and/or aspects of apparatuses 705, 705-a of FIG. 7 or 8, respectively. System 900 may include a base station 105-d. The base station 105-d may include base station antenna(s) 945, base station transceiver module(s) 950, base station memory 980, and a base station processor module 970, which each may be in communication, directly or indirectly, with each other (e.g., over one or more buses). The base station transceiver module(s) 950 may be configured to communicate bi-directionally, via the base station antenna(s) 945, with a user device 115-e, which may be an example of the user device 115 of FIG. 1 or 2. The base station transceiver module(s) 950 (and/or other components of the base station 105-d) may also be configured to communicate bi-directionally with one or more networks. In some cases, the base station 105-d may communicate with the core network 130-a and/or controller 920 through network communications module 975. Base station 105-d may be an example of the base stations 105 of FIG. 1 or 2 or the apparatus 705 of FIG. 7 or 8, and can also be an eNodeB base station, a Home eNodeB base station, a NodeB base station, and/or a Home NodeB base station. The controller 920 may be integrated into the base station 105-d in some cases, such as with an eNodeB base station 105.

The base station 105-d may also communicate with other base stations 105, such as base station 105-m and base station 105-n. Each of the base stations 105 may communicate with the user device 115-e using different wireless communications technologies, such as different Radio Access Technologies. In some cases, base station 105-d may communicate with other base stations such as 105-m and/or 105-n utilizing base station communication module 965. In some embodiments, base station communication module 965 may provide an X2 interface within an LTE wireless communication technology to provide communication between some of the base stations 105. In some embodiments, base station 105-d may communicate with other base stations 105 through controller 920 and/or core network 130-a.

The base station memory 980 may include RAM and ROM. The base station memory 980 may also store computer-readable, computer-executable software code 985 containing instructions that are configured to, when executed, cause the base station processor module 970 to perform various functions described herein (e.g., receiving and transmitting D2D discovery resource requests and responses). Alternatively, the software code 985 may not be directly executable by the base station processor module 970 but be configured to cause the computer, e.g., when compiled and executed, to perform functions described herein.

The base station processor module 970 may include an intelligent hardware device, e.g., a central processing unit (CPU) such as those made by Intel® Corporation or AMD®, a microcontroller, an application-specific integrated circuit (ASIC), etc. The base station processor module 970 may include a speech encoder configured to receive audio via a microphone, convert the audio into packets (e.g., 30 ms in length, etc.) representative of the received audio, provide the audio packets to the base station transceiver module 650, and provide indications of whether a user is speaking. Alternatively, an encoder may only provide packets to the base station transceiver module 650, with the provision or withholding/suppression of the packet itself providing the indication of whether a user is speaking.

The base station transceiver module 950 may include a modem configured to modulate the packets and provide the modulated packets to the base station antenna(s) 945 for transmission, and to demodulate packets received from the base station antenna(s) 945. While some examples of the base station 105-d may include a single base station antenna 945, the base station 105-d preferably includes multiple base station antennas 945 for multiple links which may support carrier aggregation. For example, one or more links may be used to support macro communications with the user device 115-e.

According to the architecture of FIG. 9, the base station 105-d may further include a communications management module 960. The communications management module 960 may manage communications with other base stations 105. As an example, the communications management module 960 may facilitate the transmittal of a D2D discovery resource information message 1010, as explained with reference to FIG. 10. By way of example, the communications management module 960 may be a component of the base station 105-d in communication with some or all of the other components of the base station 105-d via a bus. Alternatively, functionality of the communications management module 960 may be implemented as a component of the base station transceiver module 950, as a computer program product, and/or as one or more controller elements of the base station processor module 970.

The components for base station 105-d may be configured to implement aspects discussed above with respect to apparatuses 705 and/or 705-a of FIGS. 7 and/or 8 and may not be repeated here for the sake of brevity. For example, the base station 105-d may include a base station D2D discovery module 715-b. The base station D2D discovery module 715-b may be an example of the base station D2D discovery module 715 or base station D2D discovery module 715-a of FIG. 7 or 8, respectively. The base station D2D discovery module 715-b may be configured to perform or control some or all of the features or functions described with reference to FIG. 1, 2, 3, 7, 8, or 10 related to D2D discovery. For example, the base station D2D discovery module 715-b may be configured to support receipt and transmission of D2D discovery resource requests and responses. The base station D2D discovery module 715-b may include a discovery resource assignment module 805-a (which may be an example of the discovery resource assignment module 805 of FIG. 8), a discovery resource release module 810-a (which may be an example of the discovery resource release module 810 of FIG. 8), or a group discovery resources module 815-a (which may be an example of the group discovery resources module 815 of FIG. 8). The base station D2D discovery module 715-b, or portions of it, may include a processor, or some or all of the functions of the base station D2D discovery module 715-b may be performed by the base station processor module 970 or in connection with the base station processor module 970. Additionally, the base station D2D discovery module 715-b, or portions of it, may include a memory, or some or all of the functions of the base station D2D discovery module 715-*b* may use the base station memory 980 or be used in connection with the base station memory 980.

Figure 12:
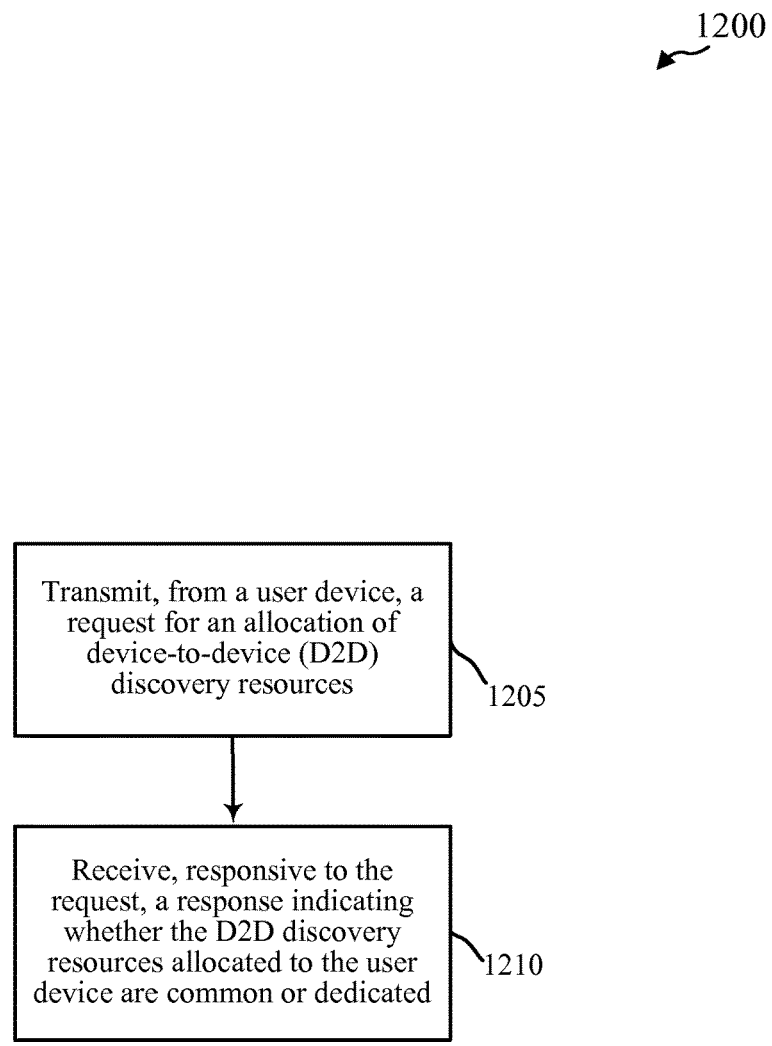
FIGS. 12-15 are flowcharts of various methods for wireless communications, in accordance with various embodiments.

FIG. 12 is a flow chart illustrating an example of a method 1200 for wireless communication, in accordance with various aspects of the present disclosure. For clarity, the method 1200 is described below with reference to aspects of one or more of the user devices 115 described with reference to FIG. 1, 2, 3, 6, or 10, or aspects of one or more of the apparatuses 405 described with reference to FIG. 4 or 5. In some examples, a user device such as one of the user devices 115 or an apparatus such as one of the apparatuses 405 may execute one or more sets of codes to control the functional elements of the user device or apparatus to perform the functions described below.

At block 1205, the method 1200 may include transmitting, from a user device 115, a request for an allocation of D2D discovery resources. The request may be in the form of a D2D discovery resource request 305, as described above with reference to FIG. 3 or 10, and as used as explained with reference to FIG. 4, 5, 6, 7, 8, or 9.

At block 1210, the method 1200 may include receiving, responsive to the request, a response indicating whether the D2D discovery resources allocated to the user device 115 are common or dedicated. The received response may be in the form of a D2D discovery resource response 310, as described above with reference to FIG. 3 or 10, and as used as explained with reference to FIG. 4, 5, 6, 7, 8, or 9.

In some embodiments, the operations at blocks 1205 or 1210 may be performed using the user device D2D discovery module 415 described with reference to FIG. 4, 5 or 6. Nevertheless, it should be noted that the method 1200 is just one implementation and that the operations of the method 1200 may be rearranged or otherwise modified such that other implementations are possible.

Figure 13:
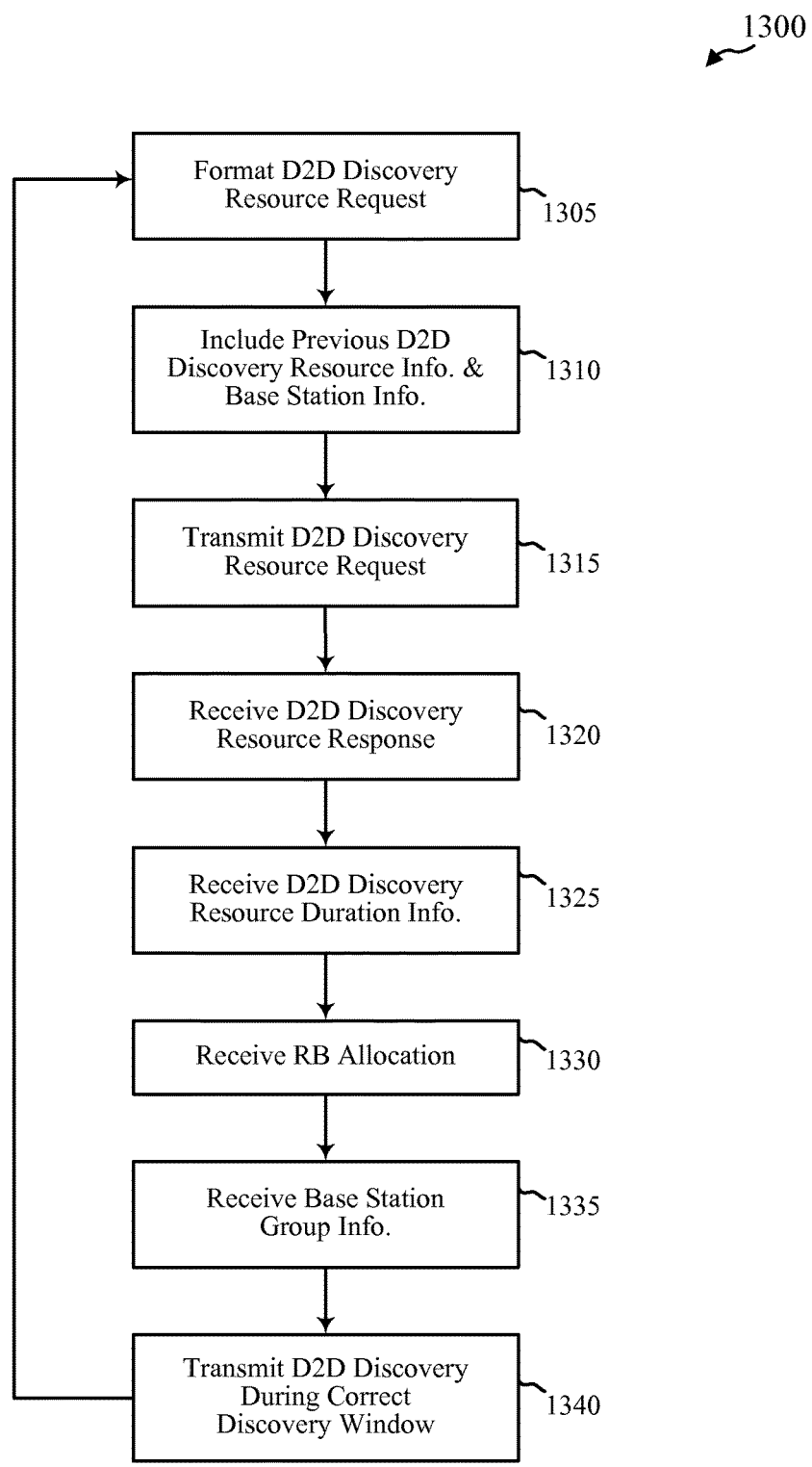

FIG. 13 is a flow chart illustrating an example of a method 1300 for wireless communication, in accordance with various aspects of the present disclosure. For clarity, the method 1300 is described below with reference to aspects of one or more of the user devices 115 described with reference to FIG. 1, 2, 3, 6, or 10, or aspects of one or more of the apparatuses 405 described with reference to FIG. 4 or 5. In some examples, a user device such as one of the user devices 115 or an apparatus such as one of the apparatuses 405 may execute one or more sets of codes to control the functional elements of the user device or apparatus to perform the functions described below.

At block 1305, the method 1300 may include formatting a D2D discovery resource request. As explained above with respect to the discovery resource request module 505 (of FIG. 5), the D2D discovery resource request 305 (as described with relation to FIG. 3, 4, 5, or 10) may have many different formats. As an example, the D2D discovery resource request 305 may be in the form of an RRC message formatted for D2D discovery requests. As another example, the D2D discovery resource request 305 may be formatted using a message format that is used for non-D2D discovery requests, as long as the request includes an indicator that the request is related to D2D discovery. Examples of modified non-D2D discovery requests include a modified BSR message, or a message associated with a RACH process.

At block 1310, the method 1300 may comprise including previous D2D discovery resource information and source base station information in the D2D discovery resource request 305. As explained above with respect to the discovery resource request module 505 and the discovery resource information module 510 (of FIG. 5), information pertaining to the D2D discovery resources previously allocated by a source base station 105 can be included in the D2D discovery resource request 305 so that a target base station 105 can then inform the source base station 105 that the previously allocated D2D discovery resources can be released. Alternatively, if the user device 115 has no valid allocated D2D discovery resources (e.g., a request for resources has been denied) or may only be using common allocated D2D discovery resources, the D2D discovery resource response 310 may be left empty. Additionally, the D2D discovery resource request 305 may indicate that the user device 115 is authorized to participate in D2D discovery.

At block 1315, the method 1300 may include transmitting the D2D discovery resource request 305. As explained above with respect to the discovery resource request module 505 (of FIG. 5), the D2D discovery resource request 305 is transmitted to a base station 105.

At block 1320, the method 1300 may include receiving a response to the D2D discovery resource request 305. The response may be in the form of a D2D discovery resource response 310 (as described with relation to FIG. 3, 4, 5, or 10). The received response may have various different formats. For example, the D2D discovery resource response 310 may be an RRC message, a MAC layer message, or a PHY layer message. Additionally, the D2D discovery resource response 310 may be an RRCConnectionReconfiguration message modified to include D2D discovery information or a DCI message granting D2D transmission resource allocation for uplink.

At block 1325, the method 1300 may include receiving information pertaining to D2D discovery resource duration. This information may be received as part of the D2D discovery resource response 310. As explained above with respect to the discovery resource information module 510 (of FIG. 5), information pertaining to D2D discovery resource duration is useful when the type of allocated D2D discovery resource is of Type 2B, meaning that the allocated D2D discovery resources are only allocated for a specific duration. Thus, for example, the received information may include an indication of a number of times the allocated D2D discovery resources may be used. Alternatively, the received information may include an indication of an amount of time for which the D2D discovery resources are allocated.

At block 1330, the method 1300 may include receiving an identification of RBs allocated for D2D discovery. This information may be received as part of the D2D discovery resource response 310. As explained above with respect to the discovery resource information module 510 (of FIG. 5), a received D2D discovery resource response 310 may include an identifier of the D2D discovery resources allocated to the user device 115, wherein the identifier identifies a plurality of RBs on a subframe allocated to the user device 115.

At block 1335, the method 1300 may include receiving base station group information. This information may be received as part of the D2D discovery resource response 310. As explained above with respect to the discovery resource information module 510 and the discovery group module 515 (of FIG. 5), a user device 115 may receive information indicating which base stations 105 or group of base stations 105 have jointly allocated D2D discovery resources to the user device 115. Thus, when the user device 115 is moved to a coverage area 110 of a different base station 105, the user device 115 is already aware of whether the user device 115 must communicate with the base station 105 in order to receive new D2D discovery resource allocations.

At block 1340, the method 1300 may include transmitting D2D discovery during a correct discovery window. Once a user device 115 receives an allocation of D2D discovery resources, the user device 115 may participate in D2D discovery. As explained above with respect to the discovery timing module 520 (of FIG. 5), the allocated D2D discovery resources are to be used at a correct time based on when the allocation is received or activated. For example, D2D discovery may not commence until a discovery period that occurs after receipt of the D2D discovery resource response 310. Alternatively, D2D discovery may commence, regardless of when the D2D discovery resource response 310 is received with relation to a discovery period, as long as the D2D discovery response 310 is received prior to the occurrence of a threshold time.

In some examples of the method 1300, the user device 115 may determine, from the response, a number of discovery signal transmissions to be performed by the user device. The response, such as the D2D discovery resource response 310 (FIG. 3), may include a parameter that indicates the number of discovery signal transmissions to be performed by the user device when discovery resources are dedicatedly provided to the user device. In a further example, the user device 115 may determine, from the response, a number of empty discovery signal transmissions after which the user device may determine that the D2D discovery resources allocated to the user device are deallocated. The response, such as the D2D discovery resource response 310, may include a parameter that indicates the number of empty discovery signal transmissions after which the user device may determine that the previously allocated D2D discovery resources are no longer allocated to the user device.

Method 1300 also illustrates that the steps 1305, 1310, 1315, 1320, 1325, 1330, 1335, and/or 1340 may be repeated as the user device requires additional allocations of D2D discovery resources. Additionally, a D2D discovery resource request transmitted from a user device 115 may include a plurality of expressions to be transmitted and a corresponding plurality of requests. In some examples, an expression to be transmitted may be a null or zero expression that indicates that resources are no longer needed. Where the D2D discovery resource request 305 includes more than one request, the D2D discovery resource response 310 received at the user device 115 may include a corresponding plurality of indications of whether D2D discovery resources allocated to the user device 115 are common or dedicated. Such indications may be made via an expression index.

It should be noted that the method 1300 is just one implementation and that the operations of the method 1300 may be rearranged or otherwise modified such that other implementations are possible. As a specific example, not every operation illustrated in the method 1300 need be performed, and many operations may be performed in different orders than those illustrated in FIG. 13.

Figure 14:
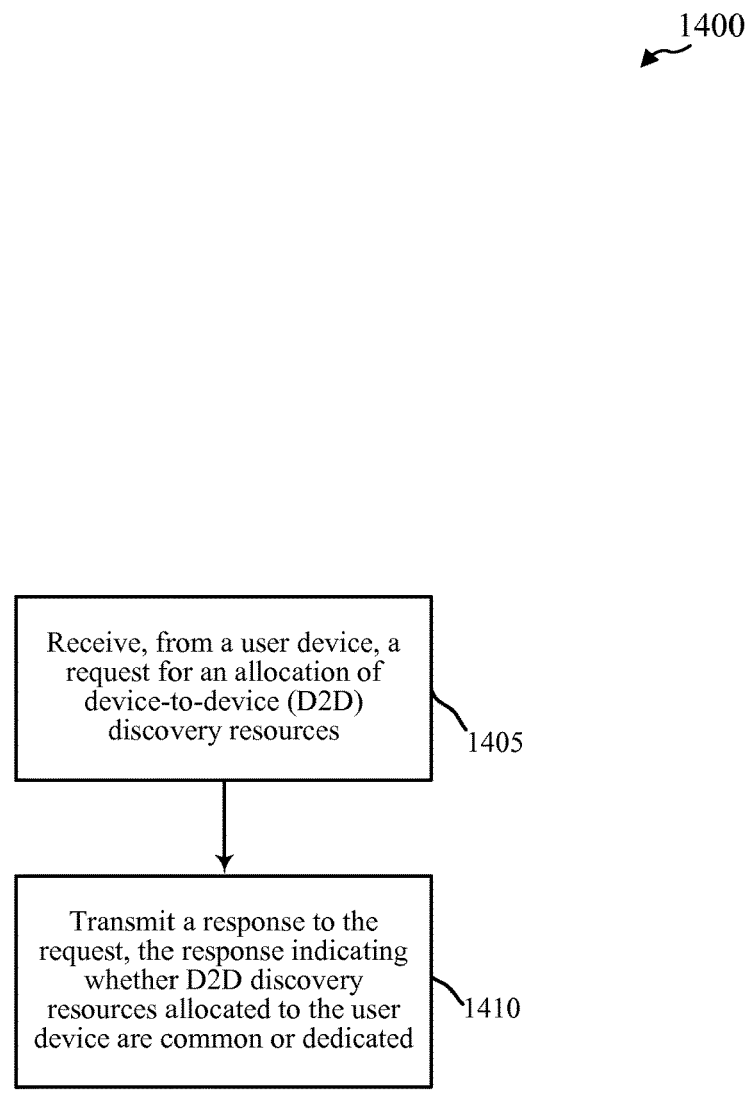

FIG. 14 is a flow chart illustrating an example of a method 1400 for wireless communication, in accordance with various aspects of the present disclosure. For clarity, the method 1400 is described below with reference to aspects of one or more of the base stations 105 described with reference to FIG. 1, 2, 3, 9, or 10, or aspects of one or more of the apparatuses 705 described with reference to FIG. 7 or 8. In some examples, a base station such as one of the base stations 105 or an apparatus such as one of the apparatuses 705 may execute one or more sets of codes to control the functional elements of the base station or apparatus to perform the functions described below.

At block 1405, the method 1400 may include receiving, from a user device 115, a request for an allocation of D2D discovery resources. The request may be in the form of a D2D discovery resource request 305, as described above with reference to FIG. 3 or 10, and as used as explained with reference to FIG. 4, 5, 6, 7, 8, or 9.

At block 1410, the method 1400 may include transmitting a response to the request, the response indicating whether D2D discovery resources allocated to the user device 115 are common or dedicated. The transmitted response may be in the form of a D2D discovery resource response 310, as described above with reference to FIG. 3 or 10, and as used as explained with reference to FIG. 4, 5, 6, 7, 8, or 9.

In some embodiments, the operations at blocks 1405 or 1410 may be performed using the base station D2D discovery module 715 described with reference to FIG. 7, 8 or 9. Nevertheless, it should be noted that the method 1400 is just one implementation and that the operations of the method 1400 may be rearranged or otherwise modified such that other implementations are possible.

Figure 15:
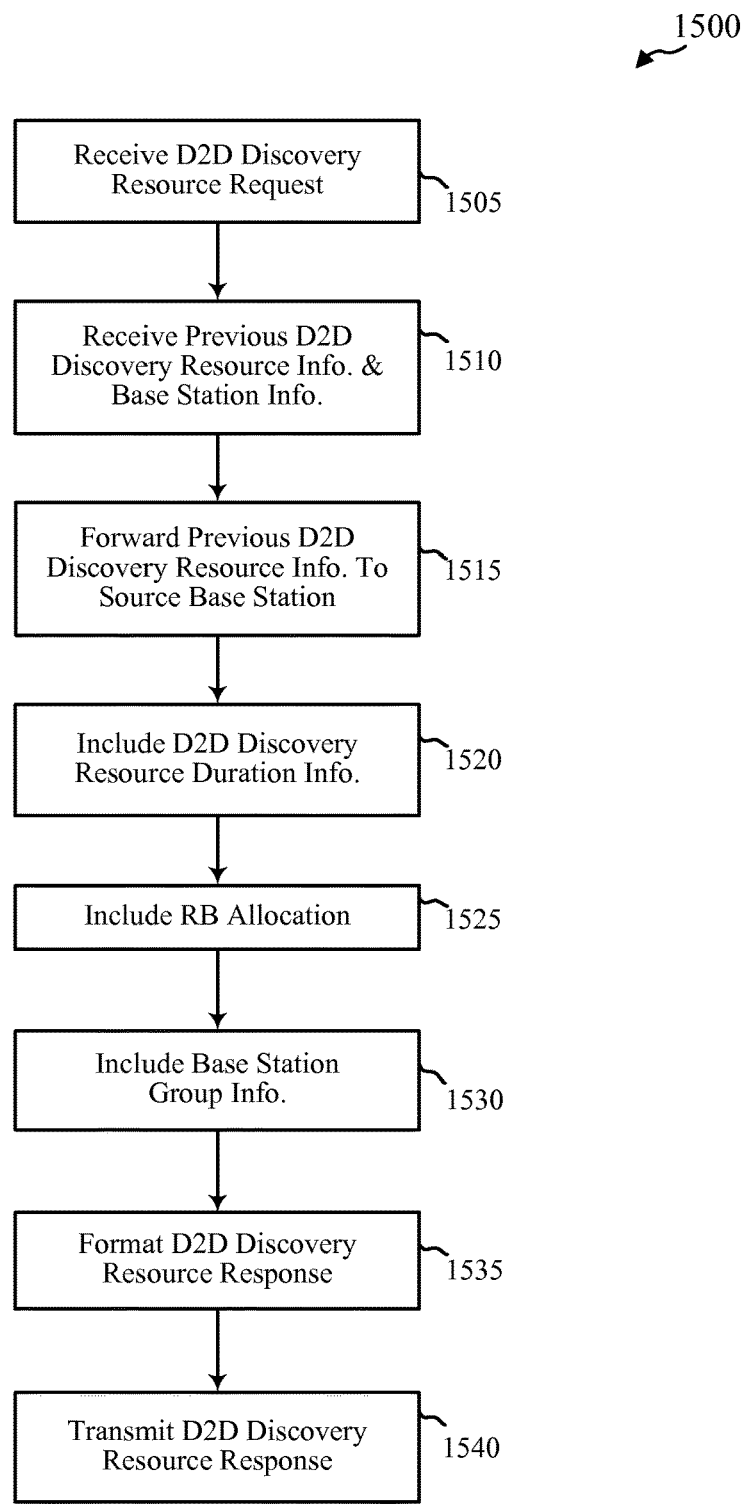

FIG. 15 is a flow chart illustrating an example of a method 1500 for wireless communication, in accordance with various aspects of the present disclosure. For clarity, the method 1500 is described below with reference to aspects of one or more of the base stations 105 described with reference to FIG. 1, 2, 3, 9, or 10, or aspects of one or more of the apparatuses 705 described with reference to FIG. 7 or 8. In some examples, a base station such as one of the base stations 105 or an apparatus such as one of the apparatuses 705 may execute one or more sets of codes to control the functional elements of the base station or apparatus to perform the functions described below.

At block 1505, the method 1500 may include receiving a D2D discovery resource request 305. As explained above with respect to the discovery resource assignment module 805 (of FIG. 8), the D2D discovery resource request 305 (as described with relation to FIG. 3, 4, 5, or 10) may have many different formats. The base station 105 is able to receive and process the D2D discovery resource request 305 in each of the different received formats.

At block 1510, the method 1500 may include receiving previous D2D discovery resource information and source base station information. This information may be received as part of the D2D discovery resource request 305. As explained above with respect to the discovery resource assignment module 805 and the discovery resource release module 810 (of FIG. 8), information pertaining to the D2D discovery resources previously allocated by a source base station 105 can be included in the D2D discovery resource request 305 so that when the base station 105 receives this information, the base station 105 can then inform a source base station 105 that the previously allocated D2D discovery resources can be released.

At block 1515, the method 1500 may include forwarding the previous D2D discovery resource information to a source base station group. As explained above with respect to the discovery resource assignment module 805 and the discovery resource release module 810 (of FIG. 8), when information pertaining to the D2D discovery resources previously allocated by a source base station 105 is included in the D2D discovery resource request 305, the target base station 105 can inform a source base station 105 that the previously allocated D2D discovery resources can be released. Alternatively, the target base station 105 can inform any or all of the base stations 105 in the group shared by the source base station 105 that the previously allocated D2D discovery resources can be released. The forwarding of the previous D2D discovery resource information may be direct, or it may be via an MME. In the case that an MME is used, the target base station 105 forwards the previous D2D discovery resource information to an MME, and then the MME notifies the source base station 105 or all the base stations 105 in the group of the source base station 105 that the previously allocated D2D discovery resources may be released.

At block 1520, the method 1500 may comprise including D2D discovery resource duration information in the D2D discovery resource response 310. As explained above with respect to the discovery resource assignment module 805 (of FIG. 8), information pertaining to D2D discovery resource duration may be transmitted to a user device 115 when the type of allocated D2D discovery resource is of Type 2B, meaning that the allocated D2D discovery resources are only allocated for a specific duration. Thus, for example, the to-be transmitted information may include an indication of a number of times the allocated D2D discovery resources may be used. Alternatively, the D2D discovery resource response 310 may include an indication of an amount of time for which the D2D discovery resources are allocated.

At block 1525, the method 1500 may comprise including in the D2D discovery resource response 310 an identification of RBs allocated for D2D discovery. As explained above with respect to the discovery resource assignment module 805 (of FIG. 8), a transmitted D2D discovery resource response 310 may include an identification of the D2D discovery resources allocated for D2D discovery. The identification may include an identifier of the RBs on a subframe allocated for use by a user device 115.

At block 1530, the method 1500 may comprise including base station group information in the D2D discovery resource response 310. As explained above with respect to the group discovery resources module 815 (of FIG. 8), a base station 105 may transmit to a user device 115 information indicating which base stations 105 or group of base stations 105 have jointly allocated D2D discovery resources to the user device 115. Thus, when the user device 115 is moved to a coverage area 110 of a different base station 105, the user device 115 is already aware of whether the user device 115 must communicate with a new base station 105 in order to receive new D2D discovery resource allocations. Accordingly, and for example, the base station 105 may include in a D2D discovery resource response 310 an indication of a plurality of neighboring base stations 105 which have allocated the D2D discovery resources to the user device 115. The plurality of neighboring base stations 105 may be a group of base stations corresponding to a tracking area used for paging. Alternatively, the indication of the plurality of neighboring base stations 105 may be transmitted to a user device 115 as a part of a SIB message.

At block 1535, the method 1500 may include formatting a D2D discovery resource response. The response may be in the form of a D2D discovery resource response 310 (as described with relation to FIG. 3, 4, 5, 7, 8, or 10). As explained above with respect to the discovery resource assignment module 805 (of FIG. 8), the response may be formatted as any one of a RRC message, a MAC layer message or a PHY layer message. Further, the response may be formatted as any one of an RRCConnectionReconfiguration message modified to include D2D discovery information or a DCI message granting D2D transmission resource allocation for uplink. Additionally, the response may be empty if D2D discovery resources to be allocated are of a Type 1 (i.e., are common discovery resources).

At block 1540, the method 1500 may include transmitting to a user device the D2D discovery resource response 310. As explained above with respect to the discovery resource assignment module 805 (of FIG. 8), the transmission of the D2D discovery resource response 310 between the base station 105 and a user device 115 may include an indication of the type of allocated D2D discovery resources, whether Type 1 or Type 2. Additionally, when the received D2D discovery resource request 305 includes a plurality of requests for D2D discovery resources for a user device 115, the transmitted D2D discovery resource response 310 may include a corresponding plurality of indications of whether D2D discovery resources allocated to the user device 115 are common or dedicated.

It should be noted that the method 1500 is just one implementation and that the operations of the method 1500 may be rearranged or otherwise modified such that other implementations are possible. As a specific example, not every operation illustrated in the method 1500 need be performed, and many operations may be performed in different orders than those illustrated in FIG. 15.

The detailed description set forth above in connection with the appended drawings describes example embodiments and does not represent the only embodiments that may be implemented or that are within the scope of the claims. The term "example" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS. LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
   transmitting, from a user device to a first base station, a first request for a first allocation of device-to-device (D2D) discovery resources;
   receiving, at the user device from the first base station, responsive to the first request, a response indicating whether the D2D discovery resources allocated to the user device are common type or dedicated type, and an identification of a plurality of neighboring base stations which have allocated the D2D discovery resources to the user device, the plurality of neighboring base stations being a group of base stations corresponding to a tracking area used for paging which have allocated the same discovery resources to the user device; and
   transmitting, from the user device, a second request for a second allocation of D2D discovery resources, when the user device is in communication with a base station that is not one of the plurality of neighboring base stations.

2. The method of claim 1, further comprising:
   receiving, when the D2D discovery resources allocated to the user device are dedicated type, an indication of a number of times the allocated D2D discovery resources may be used.

3. The method of claim 1, further comprising:
   receiving, when the D2D discovery resources allocated to the user device are dedicated type, an indication of an amount of time for which the D2D discovery resources are allocated.

4. The method of claim 1, further comprising:
   receiving in the response, when the D2D discovery resources allocated to the user device are dedicated type, an identifier of the D2D discovery resources allocated to the user device, wherein the identifier identifies a plurality of resource blocks (RBs) on a subframe allocated to the user device.

5. The method of claim 1, wherein the response is a radio resource control (RRC) message, a medium-access control (MAC) layer message or a physical (PHY) layer message, wherein when the response is an RRC message, the response is an RRCConnectionReconfiguration message modified to include D2D discovery information or a downlink control information (DCI) message granting D2D transmission resource allocation for uplink.

6. The method of claim 1, further comprising:
formatting the first request as a radio resource control (RRC) message formatted for D2D discovery requests.

7. The method of claim 1, further comprising:
formatting the first request using a message format that is used for non D2D discovery requests; and
including in the first request an indicator that the request relates to D2D discovery.

8. The method of claim 1, wherein the response for an allocation of D2D discovery resources is empty when the user device has no valid allocated D2D discovery resources and the first request is rejected or when the user device has only common type allocated D2D discovery resources.

9. The method of claim 1, further comprising:
determining that the response associated with the D2D discovery resources allocated to the user device is received during a predetermined threshold time during a discovery period; and
transmitting a D2D discovery message using the allocated D2D discovery resources allocated to the user device during the discovery period that begins after the user device receives the response.

10. The method of claim 1, wherein the first request includes a plurality of expressions to be transmitted and corresponding requests for D2D discovery resources for the user device, and the response includes a corresponding plurality of indications of whether D2D discovery resources allocated to the user device are common type or dedicated type.

11. The method of claim 10, wherein the response includes an expression index to correlate a plurality of allocated D2D discovery resources with the plurality of the requests.

12. The method of claim 1, wherein the first request for the first allocation of D2D discovery resources includes an indicator that the user device is authorized to participate in D2D discovery.

13. The method of claim 1, further comprising:
determining, from the response, a number of discovery signal transmissions to be performed by the user device based at least in part on whether the D2D discovery resources allocated to the user device are the common type or the dedicated type.

14. The method of claim 1, further comprising:
determining, from the response, a number of empty discovery signal transmissions after which the user device may determine that the D2D discovery resources allocated to the user device are deallocated.

15. A device for wireless communication, comprising:
means for transmitting, from the device to a first base station, a first request for a first allocation of device-to-device (D2D) discovery resources;
means for receiving, at the device from the first base station, responsive to the first request, a response indicating whether the D2D discovery resources allocated to the device are common type or dedicated type, and an identification of a plurality of neighboring base stations which have allocated the D2D discovery resources to the device, the plurality of neighboring base stations being a group of base stations corresponding to a tracking area used for paging which have allocated the same discovery resources to the device; and
means for transmitting, from the device, a second request for a second allocation of D2D discovery resources, when the device is in communication with a base station that is not one of the plurality of neighboring base stations.

16. The device of claim 15, further comprising:
means for receiving, when the D2D discovery resources allocated to the device are dedicated type, an indication of a number of times the allocated D2D discovery resources may be used.

17. The device of claim 15, further comprising:
means for receiving, when the D2D discovery resources allocated to the device are dedicated type, an indication of an amount of time for which the D2D discovery resources are allocated.

18. The device of claim 15, further comprising:
means for receiving in the response, when the D2D discovery resources allocated to the device are dedicated type, an identifier of the D2D discovery resources allocated to the device, wherein the identifier identifies a plurality of resource blocks (RBs) on a subframe allocated to the device.

19. The device of claim 15, wherein the response for an allocation of D2D discovery resources is empty when the device has no valid allocated D2D discovery resources and the first request is rejected or when the device has only common type allocated D2D discovery resources.

20. The device of claim 15, further comprising:
means for determining that the response associated with the D2D discovery resources allocated to the device is received during a predetermined threshold time during a discovery period; and
means for transmitting a D2D discovery message using the allocated D2D discovery resources allocated to the device during the discovery period that begins after the device receives the response.

21. The device of claim 15, wherein the first request includes a plurality of expressions to be transmitted and corresponding requests for D2D discovery resources for the device, and the response includes a corresponding plurality of indications of whether D2D discovery resources allocated to the device are common type or dedicated type.

22. An apparatus configured for wireless communication, comprising:
at least one processor; and
a memory coupled to said at least one processor, wherein said at least one processor is configured to:
transmit, from a user device to a first base station, a first request for a first allocation of device-to-device (D2D) discovery resources;
receive, at the user device from the first base station, responsive to the first request, a response indicating whether the D2D discovery resources allocated to the user device are common type or dedicated type, and an identification of a plurality of neighboring base stations which have allocated the D2D discovery resources to the user device, the plurality of neighboring base stations being a group of base stations corresponding to a tracking area used for paging which have allocated the same discovery resources to the user device; and transmit, from the user device, a second request for a second allocation of D2D discovery resources, when the user device is in communication with a base station that is not one of the plurality of neighboring base stations.

23. The apparatus of claim 22, wherein the processor is further configured to receive, when the D2D discovery resources allocated to the user device are dedicated type, an indication of a number of times the allocated D2D discovery resources may be used.

24. The apparatus of claim 22, wherein the processor is further configured to receive, when the D2D discovery resources allocated to the user device are dedicated type, an indication of an amount of time for which the D2D discovery resources are allocated.

25. The apparatus of claim 22, wherein the processor is further configured to receive in the response, when the D2D discovery resources allocated to the user device are dedicated type, an identifier of the D2D discovery resources allocated to the user device, wherein the identifier identifies a plurality of resource blocks (RBs) on a subframe allocated to the user device.

26. A non-transitory computer-readable medium having non-transitory program code recorded thereon, the non-transitory program code comprising:
    program code to transmit, from a user device to a first base station, a first request for a first allocation of device-to-device (D2D) discovery resources;
    program code to receive, at the user device from the first base station, responsive to the first request, a response indicating whether the D2D discovery resources allocated to the user device are common type or dedicated type, and an identification of a plurality of neighboring base stations which have allocated the D2D discovery resources to the user device, the plurality of neighboring base stations being a group of base stations corresponding to a tracking area used for paging which have allocated the same discovery resources to the user device; and
    program code to transmit, from the user device, a second request for a second allocation of D2D discovery resources, when the user device is in communication with a base station that is not one of the plurality of neighboring base stations.

27. The non-transitory computer-readable medium of claim 26, wherein the program code further comprises program code to receive, when the D2D discovery resources allocated to the user device are dedicated type, an indication of a number of times the allocated D2D discovery resources may be used.

28. The non-transitory computer-readable medium of claim 26, wherein the program code further comprises program code to receive, when the D2D discovery resources allocated to the user device are dedicated type, an indication of an amount of time for which the D2D discovery resources are allocated.

* * * * *